(12) United States Patent
Felix et al.

(10) Patent No.: US 10,619,105 B2
(45) Date of Patent: Apr. 14, 2020

(54) HYDROPYROLYSIS OF BIOMASS-CONTAINING FEEDSTOCKS

(71) Applicant: GAS TECHNOLOGY INSTITUTE, Des Plaines, IL (US)

(72) Inventors: Larry G. Felix, Pelham, AL (US); Martin B. Linck, Grayslake, IL (US); Terry L. Marker, Palos Heights, IL (US); Michael J. Roberts, Itasca, IL (US)

(73) Assignee: Gas Technology Institute, Des Plaines, IL (US)

( * ) Notice: Subject to any disclaimer, the term of this patent is extended or adjusted under 35 U.S.C. 154(b) by 113 days.

(21) Appl. No.: 15/474,245

(22) Filed: Mar. 30, 2017

(65) Prior Publication Data
US 2017/0204333 A1  Jul. 20, 2017

Related U.S. Application Data

(62) Division of application No. 14/321,147, filed on Jul. 1, 2014, now Pat. No. 9,650,574.

(51) Int. Cl.
*C07C 1/00* (2006.01)
*C10G 1/00* (2006.01)
(Continued)

(52) U.S. Cl.
CPC ............... *C10G 1/002* (2013.01); *C01B 3/34* (2013.01); *C10G 1/06* (2013.01); *C10G 3/42* (2013.01); *C10G 3/46* (2013.01); *C10G 3/50* (2013.01); *C10G 3/52* (2013.01); *C10K 1/32* (2013.01); *C01B 2203/0233* (2013.01); *C01B 2203/043* (2013.01); *C01B 2203/0405* (2013.01); *C01B 2203/062* (2013.01); *C01B 2203/1235* (2013.01); *C01B 2203/1264* (2013.01); *C01B 2203/148* (2013.01);
(Continued)

(58) Field of Classification Search
CPC ..................................... C07C 1/00; C10G 1/00
USPC .................................. 585/240, 241, 242, 310
See application file for complete search history.

(56) References Cited

U.S. PATENT DOCUMENTS 8,492,600 B2 * 7/2013 Marker ...................... C01B 3/16
585/240
8,735,637 B2 5/2014 Stigsson et al.
(Continued)

FOREIGN PATENT DOCUMENTS

CN   101218018 A   7/2008
JP   2012530805 A   12/2012
(Continued)

*Primary Examiner* — Thuan D Dang
(74) *Attorney, Agent, or Firm* — Banner & Witcoff, Ltd.

(57) ABSTRACT

Various techniques are disclosed for pretreating municipal solid waste (MSW) and other biomass-containing feedstocks that may be of a poorer quality and consequently more difficult, or even impossible, to convert to higher value liquid products (e.g., transportation fuels) using conventional processes. Such conventional processes may otherwise be satisfactory for the conversion of the biomass portion of the feedstock alone. The pretreatment of biomass-containing feedstocks may generally include steps carried out prior to a hydropyrolysis step and optionally further steps, in order to change one or more characteristics of the feedstock, rendering it more easily upgradable.

20 Claims, 3 Drawing Sheets

(51) Int. Cl.
    *C01B 3/34*     (2006.01)
    *C10K 1/32*     (2006.01)
    *C10G 1/06*     (2006.01)
    *C10G 3/00*     (2006.01)

(52) U.S. Cl.
    CPC .... *C10G 2300/1003* (2013.01); *Y02P 20/145* (2015.11); *Y02P 30/20* (2015.11)

(56) References Cited

U.S. PATENT DOCUMENTS

| | | |
|---|---|---|
| 9,175,228 B2 | 11/2015 | Nousiainen et al. |
| 2005/0032920 A1 | 2/2005 | Norbeck et al. |
| 2010/0003548 A1* | 1/2010 | Hall .................. B09B 3/00 |
| | | 429/411 |
| 2010/0251600 A1 | 10/2010 | Marker et al. |
| 2010/0256428 A1 | 10/2010 | Marker et al. |
| 2010/0319242 A1 | 12/2010 | Hanks et al. |
| 2013/0017460 A1 | 1/2013 | Keefer et al. |
| 2013/0030064 A1 | 1/2013 | Jiang et al. |
| 2013/0232855 A1 | 9/2013 | Loezos et al. |
| 2013/0338412 A1 | 12/2013 | Marker et al. |
| 2014/0100395 A1 | 4/2014 | Felix et al. |
| 2014/0262969 A1* | 9/2014 | Gillespie ............. B07B 4/08 |
| | | 209/44.2 |

FOREIGN PATENT DOCUMENTS

| | | |
|---|---|---|
| RU | 2459843 C1 | 8/2012 |
| RU | 2013126962 A | 1/2015 |
| WO | 2013074434 A1 | 5/2013 |

\* cited by examiner

HYDROPYROLYSIS OF
BIOMASS-CONTAINING FEEDSTOCKS

CROSS-REFERENCE TO RELATED
APPLICATIONS

This application is a divisional of U.S. application Ser. No. 14/321,147, filed Jul. 1, 2014, now allowed, the contents of which are hereby incorporated by reference their entirety.

FIELD OF THE INVENTION

The invention relates to processes for thermochemically (pyrolytically) transforming various biomass-containing feedstocks, including municipal solid waste (MSW) and algae, into high quality liquid hydrocarbon fuels.

BACKGROUND

Biomass refers to biological material derived from living or deceased organisms and includes lignocellulosic materials (e.g., wood), aquatic materials (e.g., algae, aquatic plants, and seaweed), and animal by-products and wastes (e.g., offal, fats, and sewage sludge). In the conventional pyrolysis of biomass, typically fast pyrolysis carried out in an inert atmosphere, a dense, acidic, reactive liquid bio-oil product is obtained, which contains water, oils, and char formed during the process. Much of the oxygen present in biomass ultimately resides in the bio-oil, thereby increasing its chemical reactivity.

Characteristic total acid numbers (TAN) of conventional bio-oil are in the range of 100-200, rendering it highly corrosive. Moreover, this product tends to undergo polymerization, is generally incompatible with petroleum hydrocarbons due to water miscibility and very high oxygen content (on the order of about 40% by weight), and has a low heating value. The unstable bio-oils of conventional pyrolysis tend to thicken over time and can also react to a point where hydrophilic and hydrophobic phases form. As a result, transportation and utilization of this product are problematic. Also, it is difficult to upgrade this product to a liquid hydrocarbon fuel, due to the retrograde reactions that typically occur in conventional pyrolysis processes, including fast pyrolysis. Dilution with methanol or other alcohols has been shown to reduce the activity and viscosity of the formed bio-oils, but this approach is not considered practical or economically viable, due to the large amounts of unrecoverable alcohol that are required to stabilize pyrolysis liquids.

The removal of char, generated by conventional pyrolysis, from the liquid pyrolysis product while it is still in the vapor phase presents an additional technical challenge. Significant amounts of oxygen and free radicals in the pyrolysis vapors remain highly reactive and form a pitch-like material upon contact with char particles on the surface of a filter or other solid separator. Consequently, devices used to separate char from the hot pyrolysis vapors can become quickly plugged, due to the reactions of char and pyrolysis vapor constituents that occur on and within the layer of char on the surfaces of such devices, as well as within the pores of porous filter elements. Finally, it is noted that the upgrading of pyrolysis oils, using conventional hydroconversion processes, consumes large quantities of $H_2$ and extreme process conditions, including high hydrogen pressures needed to meet product quality requirements, make such processes uneconomical. The reactions are inherently out of balance in that, due to the high pressures required, too much water is created while too much $H_2$ is consumed. In addition, conventional hydroconversion reactors can rapidly develop high pressure differentials, due to reactive coke precursors present in the pyrolysis oils or from coke produced as a result of catalysis.

More recently, the use of hydrogen in biomass pyrolysis (i.e., hydropyrolysis) has been disclosed. For example, hydropyrolysis processes taught in U.S. Pat. No. 8,492,600 have been found to overcome a number of the drawbacks of conventional fast pyrolysis processes, including those described above, and have led to a number of other processing advantages.

Various feedstocks may comprise biomass, but in many cases also contain significant amounts of other materials that present technical challenges to converting such feedstocks to higher value liquid products, including hydrocarbon-containing products useful for transportation fuels. Municipal solid waste (MSW), for example, can present an essentially no-cost source of biomass (e.g., waste wood, yard waste, and agricultural waste) and biomass-derived materials (e.g., paper, cardboard, medium density fiberboard (MDF), and particleboard). MSW may, however, also contain significant amounts of non-biological materials, e.g., plastic, glass, waste metal, etc., which are derived from petroleum or minerals. Ash, which refers to the non-combustible solid powder residue (generally containing metals and/or metal oxides) left behind following combustion, is present to some extent in biomass as a non-biological material. However, the presence of other non-biological materials in MSW can lead to a higher overall ash content, relative to that of the biomass portion of the MSW alone. Non-biological materials in MSW complicate upgrading processes, including those that involve pyrolysis in the presence of hydrogen (hydropyrolysis), and optionally other processing steps leading to the production of higher value liquids such as transportation fuel fractions.

The presence of non-biological materials in MSW can additionally alter the overall atomic ratios present in the feedstock, compared to the atomic ratios of the biomass portion of the MSW alone. For example, the ratio of oxygen to carbon in the feedstock may be reduced, thereby affecting the reactions occurring during pyrolysis, and/or subsequent processing. This, in turn, can adversely impact the quality of the products obtained and/or otherwise significantly increase the costs associated with obtaining products of given quality and yield. The bulk mechanical properties of MSW feedstock, as it undergoes heating to carry out desired conversion steps (e.g., fluidized bed hydropyrolysis), may also differ significantly from the mechanical properties of purely biomass-containing feedstocks, such as lignocellulosic materials. The differing process conditions and/or additional process steps, as needed to compensate for these characteristics of MSW, relative to conventional feeds, can vary greatly. This is particularly the case in processes for converting MSW to liquid products that include hydropyrolysis and optionally other upgrading steps.

More recently, the potential for using algae and *lemna* (sea weeds) as a source of biomass for producing higher value liquids has gained attention. Algae grown in salt water may, however, contain large amounts of sodium and chlorine relative to other sources of biomass (e.g., wood). Sodium is a potential catalyst poison that may be detrimental to the activity of catalysts used in biomass conversion processes, such as catalytic hydropyrolysis and/or catalytic hydroconversion (e.g., hydrodeoxygenation). The existence of chlorine in a hydrogen environment, and particularly in the presence of a catalyst with hydrogenation activity, can lead to the formation of hydrogen chloride gas (HCl). If water is also present, the condensation of aqueous HCl (i.e., hydrochloric acid) on metallic surfaces can lead to the rapid corrosion of metallic process vessels and even catastrophic failure. Higher grades of metallurgy (e.g., Hastelloy®) over stainless steel can offer some protection, but only at significantly increased capital expense. With respect to MSW feedstocks, the presence of relatively high amounts of other heteroatoms, such as sulfur and nitrogen, under hydrogenation conditions leads to the formation of $H_2S$ and $NH_3$ that likewise pose concerns in terms of their corrosivity and potential detrimental health effects.

Therefore, while MSW and algae provide attractive, low-cost (or no-cost) feedstocks for producing green energy with little or no associated greenhouse gas (GHG) emissions, they also present the technical challenges identified above. There is consequently a need in the art for processes that address some or all of these challenges, and particularly processes involving the hydropyrolysis of feedstocks containing non-biological materials. The ability to transform readily available raw materials, including materials that are otherwise regarded as waste products, to provide higher value liquids (e.g., hydrocarbon-containing liquids), would represent a major breakthrough in realizing cost-competitiveness with conventional petroleum refining processes.

SUMMARY

The present invention is associated with the discovery of various techniques for pretreating MSW, algae, *lemna* (sea weeds), and other biomass-containing feedstocks that may be of a poorer quality relative to conventional, purely lignocellulosic materials and consequently more difficult to convert to higher value liquid products (e.g., transportation fuels), using conventional processes. Such conventional processes might otherwise be satisfactory for the conversion of the biomass alone (e.g., the biomass portion of MSW). The pretreatment of biomass-containing feedstocks described herein may generally include steps carried out prior to a hydropyrolysis step and optionally further steps, in order to change one or more characteristics of the feedstock, rendering it more easily upgradable. By this it is meant that processes according to the invention broadly include those in which a biomass-containing feedstock is subjected to at least a pretreatment step and a subsequent hydropyrolysis step, in which a higher value liquid product is obtained, wherein, in the absence of the pretreatment step the same liquid product (i.e., in terms of both quality and yield) could not be obtained without added capital input (equipment) and/or energy input, following the hydropyrolysis step and any further steps of the process. According to some embodiments, the added capital and/or energy input, associated with a comparable downstream processing solution, would exceed the respective capital and energy input(s) associated with the pretreatment step.

According to some embodiments, the pretreatment step may be integrated into the overall process, meaning that one or more products of the pretreatment step (e.g., pre-reactor process vapors or solid, pretreated feedstock) may be fed continuously to further steps (e.g., hydropyrolysis) of the process. It is also possible that one or more intermediate or final products of the overall process (e.g., reformed hydrogen or partially spent deoxygenating catalyst from the hydropyrolysis reactor) may be used in the pretreatment step, providing further integration. In other embodiments, the pretreatment step may be performed separately (i.e., as a step that is not integrated), for example by first collecting products of the pretreatment step and then feeding the pretreated products to a hydropyrolysis step at a later time (e.g., after a period of at least one hour or at least one day). As another example of a pretreatment step that is not integrated, this step may be performed at a location that is remote from (e.g., at least one mile from or at least 100 miles from) the location of the hydropyrolysis step.

According to some embodiments, the pretreatment step may involve chemically converting the biomass-containing feedstock and may be performed in a reactor (e.g., in a separate pre-reactor, or otherwise in situ in the hydropyrolysis reactor). In other embodiments, the pretreatment step may involve only a physical separation or sorting of certain components (e.g., the removal of glass and/or plastic) of the biomass-containing feedstock. In yet other embodiments, the pretreatment step may involve both chemical conversion and physical separation. In particular embodiments, a reactor used for pretreatment of the biomass-containing feedstock, namely a pre-reactor, may affect chemical conversion and/or physical separation to yield a pretreated feedstock (e.g., a pre-reactor vapor stream). For example, chemical conversion can include, at least to a limited extent, pyrolysis and hydropyrolysis reactions preceding those that occur in the hydropyrolysis reactor and optionally further steps. Physical separation can include devolatilization of the biomass-containing feedstock, meaning separation (by volatilization) of relatively volatile components of the biomass-containing feedstock by subjecting it to heat and/or flowing gas.

Aspects of the invention therefore relate to processes, and especially processes having an integrated pretreatment step (e.g., a devolatilizing step that occurs in a pre-reactor), for converting a biomass-containing feedstock (e.g., MSW, algae, or *lemna* (sea weeds)) into a higher value liquid product such as a product comprising a desired compound (e.g., levoglucosan), a desired class of compounds (e.g., aromatic hydrocarbons), or a desired mixture of compounds (e.g., gasoline or diesel fuel boiling-range hydrocarbons).

One representative embodiment, described more fully below, is a process comprising devolatilizing a biomass-containing feedstock in a pre-reactor vessel containing hydrogen and a solid bed material selected from the group consisting of a pretreating catalyst, a sorbent, a heat transfer medium, and mixtures thereof, to produce a pre-reactor vapor stream comprising entrained solid particles (e.g., particles of solid bed material and/or char particles). The pre-reactor vessel may be separate from a hydropyrolysis vessel, used for hydropyrolyzing at least a portion of the pre-reactor vapor stream exiting the pre-reactor. By maintaining separate vessels, different pretreating and hydropyrolysis conditions can be maintained and manipulated independently, as needed to effectively process a given biomass-containing feedstock. In addition, the pre-reactor vapor stream may be subjected to a number of processing steps (e.g., solids removal, condensation, heating, mixing, etc.), prior to introducing at least a portion thereof to the hydropyrolysis reactor vessel. According to other embodiments, the pre-reactor and hydropyrolysis reactor may be part of a single, combined pretreating/hydropyrolysis vessel, in which, for example, the pre-reactor portion of this vessel may reside in a lower portion and the hydropyrolysis reactor portion may reside in an upper portion. This configuration may be desirable, for example, if conditions in the pre-reactor and hydropyrolysis reactor do not differ markedly, and energy savings can be realized by conducting both steps within a single vessel.

Another representative embodiment, described more fully below, is a process comprising pretreating an initial feedstock to produce a pretreated feedstock, wherein the pretreated feedstock has at least one improved characteristic over the initial feedstock. The improved characteristic may be selected from the group consisting of a reduced non-biological material content (e.g., a reduced ash content), a higher temperature, a reduced average particle size, a reduced average particle aerodynamic diameter, an increased average particle surface area to mass ratio, a reduced average particle terminal velocity, a more uniform particle size, a reduced corrosive species content, a reduced hydropyrolysis catalyst poison content, and a reduced hydroconversion catalyst poison content.

Following a devolatilizing step or other pretreating step as described above, representative processes may further comprise hydropyrolyzing at least a portion of the pre-reactor vapor stream or at least a portion of another pretreated feedstock as described above in a hydropyrolysis reactor vessel containing hydrogen and a deoxygenating catalyst. A hydropyrolysis reactor output is produced, comprising (i) at least one non-condensable gas (e.g., $H_2$, $CO_2$, CO and/or one or more low molecular weight hydrocarbon gases such as $CH_4$, $C_2H_6$, and/or $C_2H_4$), (ii) a partially deoxygenated hydropyrolysis product (e.g., in the form of a condensable vapor), and (iii) solid char particles. Some or all of the hydropyrolysis reactor output may then be hydroconverted in a hydroconversion reactor vessel (or a hydroconversion zone comprising two or more hydroconversion reactor vessels in series or parallel) to further reduce oxygen content and provide a substantially fully deoxygenated hydrocarbon liquid that, when condensed from a hydroconversion reactor vessel (or hydroconversion zone) outlet and then phase separated (from a condensed aqueous phase), is a high value liquid product (e.g., a liquid product containing gasoline and/or diesel fuel boiling-range hydrocarbon fractions that, following separation by distillation, are suitable as fuels or fuel additives).

According to further embodiments, the pre-treating step and consequently the improved characteristic(s) of the feedstock, as described above, may be obtained in situ, i.e., within the pre-reactor vessel and/or the hydropyrolysis reactor vessel. In such cases, the pretreated feedstock having the improved characteristic may be introduced directly into a downstream hydropyrolysis reactor or hydroconversion reactor, without any intermediate recovery.

In yet further embodiments, representative processes comprise hydropyrolyzing, in a hydropyrolysis reactor vessel containing hydrogen and a deoxygenating catalyst, a pretreated feedstock as described herein. Particular embodiments may further comprise hydroconverting, in a hydroconversion reactor vessel (or hydroconversion zone), at least a portion of the hydropyrolysis reactor output as described herein.

These and other embodiments, aspects, features, and advantages of the present disclosure will be apparent from the following detailed description of the illustrated embodiments thereof, which are to be read in connection with the accompanying drawings.

BRIEF DESCRIPTION OF THE DRAWINGS

A more complete understanding of the exemplary embodiments of the present invention and the advantages thereof may be acquired by referring to the following description in consideration of the accompanying figures, in which the last two digits of reference numbers in the figures indicate like features and wherein:

FIGS. 1-3 should be understood to present an illustration of the invention and/or principles involved. Simplified process flow schemes are used, in order to facilitate explanation and understanding. Details including pumps, heaters and some heat exchangers, valves, instrumentation, and other items not essential to the understanding of the invention are not shown. As is readily apparent to one of skill in the art having knowledge of the present disclosure, methods for providing hydroprocessed biofuels according to various other embodiments of the invention, will have configurations and components determined, in part, by their specific use.

DETAILED DESCRIPTION

Figure 1:
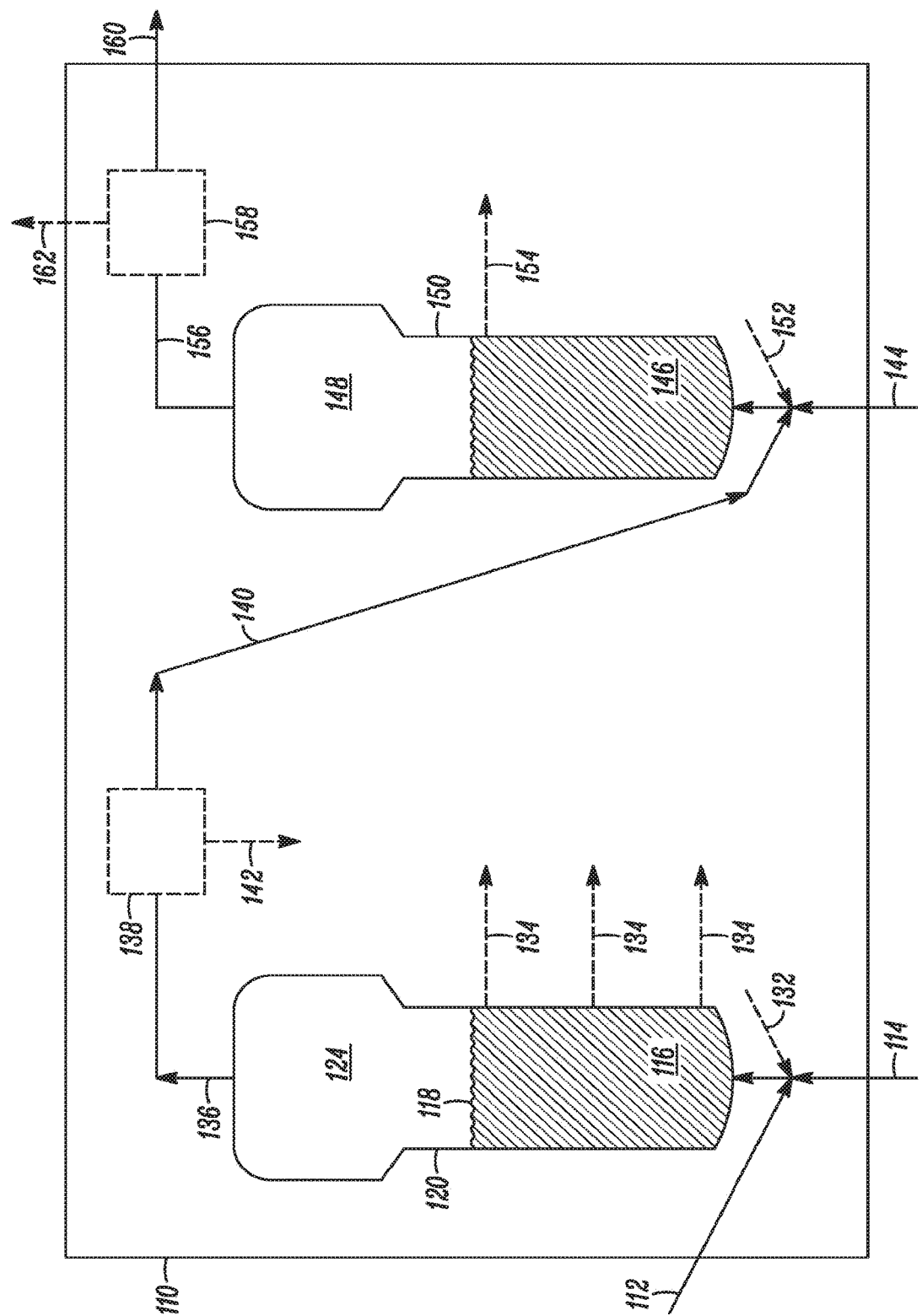
FIG. 1 is a schematic flow diagram of a system, including a pre-reactor and a hydropyrolysis reactor, according to one embodiment of this disclosure.

Aspects of the invention relate to integrated processes for converting a raw or initial feedstock (e.g., MSW or algae) into higher value liquids. The term "higher value liquids" refers to liquid products of the processes described herein, involving hydropyrolysis, having a greater value (e.g., on a weight basis) than the initial feedstock and generally also greater than the pretreated feedstock (e.g., a pre-reactor vapor stream or another pretreated feedstock as described herein). Representative higher value liquids include individual compounds (e.g., levoglucosan), classes of compounds (e.g., aromatic hydrocarbons), and mixtures of compounds suitable for a particular purpose (e.g., gasoline or diesel fuel boiling-range hydrocarbons suitable for use as transportation fuels or otherwise blending into such fuels). Representative raw or initial feedstocks include those comprising biomass (e.g., derived from organisms living above the earth's surface or within the earth's oceans, rivers, and/or lakes) in addition to non-biological materials (e.g., materials derived from petroleum, such as plastics, or materials derived from minerals extracted from the earth, such as metals and metal oxides, including glass).

The initial feedstocks may be used in a dry form, for example, after being subjected to drying at elevated temperature (e.g., greater than about 50° C. for a time sufficient to reduce the moisture content of the initial feedstock to less than about 1% by weight, or even less than about 0.1% by weight). According to other embodiments, the initial feedstocks may include moisture (e.g., have a moisture content of greater than about 1%, such as from about 1% to about 10% by weight). In still other embodiments, the initial feedstock may be used in the form of an aqueous slurry. In general, processes described herein do not require a severely dried initial feedstock, as the inclusion of water can be beneficial in terms of its ability to form hydrogen via the water-gas shift reaction under conditions in one or more of a pre-reactor vessel, a hydropyrolysis reactor vessel, and/or a hydroconversion reactor vessel, as described herein.

Representative biomass in a biomass-containing, initial feedstock can include any plant material, or mixture of plant materials, such as a hardwood (e.g., whitewood), a softwood, a hardwood or softwood bark, lignin, algae, and/or

*lemna* (sea weeds). Energy crops, or otherwise agricultural residues (e.g., logging residues) or other types of plant wastes or plant-derived wastes, may also be used as plant materials. Specific exemplary plant materials include corn fiber, corn stover, and sugar cane bagasse, in addition to "on-purpose" energy crops such as switchgrass, *miscanthus*, and algae. Short rotation forestry products, such as energy crops, include alder, ash, southern beech, birch, *eucalyptus*, poplar, willow, paper mulberry, Australian Blackwood, sycamore, and varieties of *paulownia* elongate. Other examples of suitable biomass include organic waste materials, such as waste paper, construction, demolition wastes, and biosludge.

Devolatilization and/or Partial Hydropyrolysis in a Pre-Reactor

Particular aspects of the invention relate to processes for producing liquid products from biomass-containing feedstocks. Representative processes comprise contacting the feedstock with hydrogen in a pre-reactor vessel containing a solid bed material, to devolatilize and/or at least partially hydropyrolyze the feedstock (i.e., at least partly pyrolyze or thermally decompose the feedstock in the presence of the hydrogen). Accordingly, the processes may comprise devolatilizing the feedstock in a pre-reactor vessel containing hydrogen and a solid bed material, in which the devolatilization may, but does not necessarily, accompany hydropyrolysis. Those skilled in the art, consulting the present disclosure, will appreciate the operating parameters needed to achieve devolatilization or a combination of devolatilization and hydropyrolysis in the pre-reactor. Unless noted otherwise, the term "devolatilizing" is meant to encompass both devolatilization only, in addition to a combination of devolatilization and hydropyrolysis. In particular embodiments, the devolatilization is performed without accompanying hydropyrolysis.

The devolatilizing step of representative processes may include introducing a pre-reactor gas and the feedstock to the pre-reactor vessel containing the solid bed material. The pre-reactor gas and feedstock may be introduced as separate streams to the pre-reactor or otherwise mixed prior to their introduction. The pre-reactor gas and/or feedstock, whether or not mixed prior to being introduced to the pre-reactor, may be divided and directed to multiple (i.e., at least two, for example from two to ten) inlet locations, which may, for example, correspond to different axial heights of the pre-reactor vessel. Some portion, or all, of these heights may be below the height of a bed (e.g., a fluidized particle bed) of solid bed material within the reactor. Likewise, another portion, or all, of these heights may be above the height of such a bed. The pre-reactor gas will generally be a hydrogen-containing gas, such that the pre-reactor vessel will contain hydrogen and hydropyrolysis may accompany the devolatilization, as described above. It is also possible, according to other embodiments, to use a non-hydrogen containing pre-reactor gas containing, for example, nitrogen, oxygen, helium, $CO_2$, etc. and mixtures of these. In the case of a non-hydrogen containing pre-reactor gas, pyrolysis (rather than hydropyrolysis) may accompany devolatilization of the feedstock in the pre-reactor.

Whether or not the pre-reactor gas contains hydrogen, in some embodiments this gas may be used to fluidize the solid bed material, such that it may be more descriptively termed a "pre-reactor fluidizing gas." Accordingly, the solid bed material, optionally together with char, in the pre-reactor may be present as a fluidized bed, and in particular as a particulate fluidization, bubbling, slugging, turbulent, or fast fluidized bed, depending on the superficial gas velocity of the pre-reactor fluidizing gas. In such fluidized bed systems, the pre-reactor may advantageously include an expanded solids disengagement section (i.e., a section of expanded reactor diameter or cross-sectional area, relative to the diameter or cross-sectional area of the fluidized bed) at a suitable height above the fluidized bed (e.g., above the transport disengaging height, TDH), in order to promote the separation of solid particles. Other gas-solids separation devices (e.g., filters, cyclones, etc.) may be employed in place of, but preferably in combination with, the use of an expanded solids disengagement section. A circulating fluidized bed system for the pre-reactor may also be employed.

Overall, according to some embodiments, the step of devolatilizing the feedstock in the pre-reactor vessel may be performed using a fluidized bed of the feedstock and the solid bed material, together with char particles generated via devolatilization of the feedstock, in the pre-reactor vessel. Fluidization in the pre-reactor vessel may be performed with a pre-reactor fluidization gas having a superficial velocity effective for carrying out the type of fluidization desired (e.g., bubbling bed fluidization), considering the properties of the biomass-containing feedstock, conditions within the pre-reactor vessel, and the particular fluidization gas being used. In general, a pre-reactor fluidization gas, and particularly a fluidization gas comprising hydrogen, will have a superficial velocity of generally greater than about 3 meters per second (m/s) (e.g., from about 3 m/s to about 25 m/s), typically greater than about 5 m/s (e.g., from about 5 m/s to about 15 m/s), and often greater than about 7 m/s (e.g., from about 7 m/s to about 12 m/s).

In other embodiments, the pre-reactor may contain a solid bed material, as described herein that is not fluidized. For example, a heated ball mill may be used to devolatilize the feedstock (e.g., in the presence of pure hydrogen, a hydrogen-containing gas, or other gas used to achieve devolatilization) at ambient or elevated pressure. Devolatilization may be conducted, for example, in the presence of hydrogen at elevated pressure.

The solid bed material may be selected from a pretreating catalyst, a sorbent, a heat transfer medium, and mixtures thereof. Suitable solid bed materials include those having dual or multiple functions. For example, a "pretreating catalyst" may also act to transfer heat to or from the pre-reactor and specifically to the particles of initial feedstock that contain biomass. Likewise, a "heat transfer medium" may be inert in the environment of the pre-reactor, but it may also have catalytic and/or adsorptive capacity with respect to any reactants or other components in the environment of the pre-reactor. Unless noted otherwise, the designations "pretreating catalyst," "sorbent," or "heat transfer medium," include solid bed materials having functions other than purely catalytic, adsorptive, or heat transfer functions, respectively, in the environment of the pre-reactor. It is possible, however, in alternative embodiments, for a solid bed material to be a pretreating catalyst but not have adsorptive capacity for components in the environment of the pre-reactor and/or not act to transfer heat to or from the pre-reactor. Likewise, it is possible for a solid bed material to be a sorbent but not have catalytic activity with respect to reactants or other components in the environment of the pre-reactor and/or not act to transfer heat to or from the pre-reactor. Similarly, it is possible for a solid bed material to be a heat transfer medium but not have catalytic activity with respect to reactants or other components in the environment of the pre-reactor and/or not have adsorption capacity for components in the environment of the pre-reactor. Mixtures of different solid bed materials that are pretreating catalysts, sorbents, and/or heat transfer media as defined above (e.g., a mixture of a catalyst and a heat transfer medium) may also be used.

According to a particular embodiment, the solid bed material may be a heat transfer medium, with or without adsorption capacity, such that the bed material promotes devolatilization of the feedstock and either adsorbs catalyst poisons and/or corrosive species (e.g., chloride) or allows such poisons and/or corrosive species to be removed with char exiting the pre-reactor. In the latter case, in which the solid bed material promotes devolatilization but lacks adsorption capacity, the poisons and/or corrosive species may nevertheless be separated from the pre-reactor vapor stream exiting the pre-reactor. Using such a separation step, the poisons and/or corrosive species may be absent or substantially absent from the portion of the pre-reactor vapor stream that is passed to the hydropyrolysis reactor vessel, despite the lack of adsorptive capacity. Overall, the particular function(s) chosen for the solid bed material will depend on the nature of the biomass-containing feedstock and the nature of the impurities contained therein.

According to exemplary embodiments, described in greater detail below, the solid bed material used in the pre-reactor vessel may be a pretreating catalyst having activity for cracking or deoxygenation of the feedstock. Particular pretreating catalysts (e.g., zeolite-containing catalysts such as ZSM-5 catalysts) may have activity for both cracking and deoxygenation. According to other exemplary embodiments, the solid bed material may include a sorbent having the capacity to adsorb corrosive species (e.g., chloride-containing species). The solid bed material may alternatively, or in combination, include a sorbent having the capacity to adsorb poisons (e.g., metal contaminants such as sodium) of the deoxygenating catalyst and/or hydroconversion catalyst. This can result in a pretreated feedstock, used subsequently in hydropyrolysis, having at least the improved characteristic(s) of a reduced corrosive species content, a reduced hydropyrolysis catalyst poison content, and/or a reduced hydroconversion catalyst poison content.

In representative embodiments, pretreatment in a pre-reactor, as described above, produces a pre-reactor vapor stream comprising entrained solid particles (e.g., particles of char and/or solid bed material). Alternatively, depending on the operating conditions and gas-solid separations occurring within the pre-reactor, the pre-reactor vapor stream may be substantially or completely devoid of solid bed material. The pre-reactor vapor stream may include condensable gases (e.g., water vapor and/or oxygenated hydrocarbons such as phenols) as well as non-condensable gases (e.g., hydrogen, CO, and/or $CO_2$). The condensable gases will generally have a high oxygen content (e.g., in the range from about 35% to about 55% by weight), characteristic of conventional bio-oils obtained from pyrolysis in the substantial absence of any deoxygenation reactions. Normally, the pre-reactor vapor stream, or at least a portion thereof, will be passed completely in the vapor phase to a subsequent hydropyrolyzing step, without intermediate condensing of any portion of this stream. However, intermediate condensing with re-heating may also be possible, for example, to selectively condense unwanted components of relatively low volatility (relatively high boiling point), optionally providing a liquid condensate "wash" for removing at least some char and/or other solid particles. In other embodiments, the pre-reactor vapor stream may be partially condensed and passed as a mixed vapor and liquid phase to the subsequent hydropyrolyzing step. Partial condensation may occur, for example, when heat is recovered from the pre-reactor vapor stream (e.g., by heat exchange with a cooler stream), or when heat is otherwise lost to the environment.

As is apparent from the above description, all or a portion of the pre-reactor vapor stream exiting the pre-reactor may be subjected to the subsequent hydropyrolyzing step. Between the steps of devolatilizing and hydropyrolyzing, the pre-reactor vapor stream may, by separation or reaction (e.g., water-gas shift reaction), be enriched with respect to one or more desired components and/or depleted with respect to one or more undesired components (e.g., in the case of partial condensation, which may serve to remove some of the solid particles). The pre-reactor vapor may also be mixed prior to or during the hydropyrolyzing step with one or more additional streams. Accordingly, unless otherwise noted, the step of hydropyrolyzing at least a portion of the pre-reactor vapor stream is meant to encompass such intermediate steps as separation, reaction, and/or mixing of the pre-reactor vapor stream or portion thereof. In some embodiments, however, the pre-reactor process vapor stream or portion thereof may be subjected to the hydropyrolyzing step, without an intermediate step of being enriched with respect to one or more desired components and/or depleted with respect to one or more undesired components, by separation or reaction. For example a portion of the pre-reactor process vapor stream may be split from the entire effluent of the pre-reactor, with little or no change in its composition. Likewise, the pre-reactor vapor stream, or portion thereof, may be subjected to the hydropyrolyzing step, without being mixed prior to or during the hydropyrolyzing step with one or more additional streams. However, in many cases it will be desirable to mix the pre-reactor vapor stream or portion thereof with hydrogen or a hydrogen-containing gas stream that provides additional hydrogen (beyond that contained in the pre-reactor vapor stream or portion thereof alone) for hydropyrolysis as described below.

Thus, some or all of the pre-reactor vapor stream may be passed to a hydropyrolysis reactor vessel. In the case of a pre-reactor vapor stream that contains entrained solid particles, it may be desirable to separate a relatively low quality portion of this vapor stream, such as a solids-enriched stream (i.e., having a higher concentration of solids relative to that of the pre-reactor vapor stream) and a purified pre-reactor vapor stream (having a lower concentration of solids relative to that of the pre-reactor vapor stream). In this low quality, solids-enriched stream, the solid particles may also have a higher average particle size and/or a higher average particle weight (e.g., in the case of cyclone separation, electrostatic precipitation, or other separation based on particle size or having a particle size cutoff), compared to solid particles in the purified pre-reactor vapor stream (and also compared to the total solid particles in the pre-reactor vapor stream prior to the separation). In such an embodiment where a separation of the pre-reactor vapor stream is performed, in order to provide a relatively low quality, solids-enriched stream, the relatively high quality, purified pre-reactor vapor stream may be the portion of the pre-reactor vapor stream that is hydropyrolyzed in the hydropyrolysis reactor vessel.

In the case of removal of a portion, for example substantially all, of the entrained solid particles from the pre-reactor vapor stream, the resulting purified pre-reactor vapor stream may represent a suitable portion of the pre-reactor output that is sent to a subsequent hydropyrolyzing step in a hydropyrolysis reactor vessel. According to some embodiments, entrained solid particles in the pre-reactor vapor stream may comprise both a portion of the solid bed material, as described above, and char formed from the initial feedstock. In this case, representative processes may comprise recovering at least a portion of the entrained solid bed material for re-use in the pre-reactor, optionally with supplemental heating of the recovered solid bed material, in order to transfer heat into the pre-reactor vessel. Specifically, a step of (1) separating, from the entrained solid particles (e.g., present in the pre-reactor vapor stream), a first fraction enriched in the char and a second fraction enriched in the solid bed material (i.e., meaning that the fractions, which may themselves be solid-containing gas streams, are enriched relative to the content of the char and solid bed material, respectively, in the pre-reactor vapor stream) may be employed. This may be accompanied by the subsequent steps of (2) heating at least a portion of the second fraction and (3) returning the second fraction, or portion thereof that has been heated, back to the pre-reactor vessel.

The solid bed material may alternatively be withdrawn from the pre-reactor vessel, not as entrained particles in the pre-reactor vapor stream, but from a fluidized particle bed within this vessel. In either case of withdrawing the solid bed material from the pre-reactor vessel, i.e., in the pre-reactor vapor stream exiting the pre-reactor or from a solids drawoff outlet exiting the particle bed, the withdrawn solid material may be separated from solid char particles in a fraction enriched in the solid bed material (e.g., by using a density separation) and returned to the pre-reactor. Prior to the return of the fraction enriched in the solid bed material, this fraction may be heated to introduce needed heat into the pre-reactor. The heating and return of any removed solid bed material may, according to alternative embodiments, be beneficial in the absence of a separation that provides a fraction enriched in the solid bed material. In many cases, solid bed material removed from the pre-reactor may have accumulated coke and carbon deposited thereon, as a result of its use in the operation of the pre-reactor. Therefore, any removed solid bed material, either in the pre-reactor vapor stream or from the particle bed, and whether or not separated into a fraction enriched in the solid bed material, may be subjected to conditions under which accumulated coke and carbon are removed, prior to the return of the solid bed material to the pre-reactor (e.g., in a heated condition). Representative conditions include oxidizing conditions sufficient to regenerate the solid bed material by removing the accumulated coke and carbon by combustion, as well as reducing conditions (e.g., in the presence of a flowing hydrogen-containing gas) sufficient to hydrogasify the accumulated coke and carbon, converting these contaminants to methane and other light hydrocarbons. Regeneration and hydrogasification, for example in a fluidized bed that simultaneously acts to classify solid particles removed from the pre-reactor, are described in greater detail below. The simultaneous hydrogasification and sulfiding of removed solid bed material is also described in greater detail below.

Representative devolatilizing steps may therefore comprise withdrawing a portion of the solid bed material from the pre-reactor vessel and contacting this portion with a fluidizing oxygen-containing gas (in the case of regeneration) or otherwise with a fluidizing hydrogen-containing gas (in the case of hydrogasification), to either combust coke and carbon that has accumulated on the solid bed material during the devolatilizing step (in the case of regeneration) or covert this coke and carbon to methane (in the case of hydrogasification). In either case, the withdrawn solid bed material, having a reduced content of coke and carbon as a result of regeneration or hydrogasification, may be returned to the pre-reactor.

Any steps described herein, pertaining to the removal of solid bed material from the pre-reactor vessel (either in the pre-reactor vapor or from the particle bed), as well as the optional separation of solid bed material from char, optional regeneration, or optional hydrogasification, together with the return of the solid bed material in a heated and/or regenerated condition, are equally applicable to the removal of deoxygenating catalyst from the hydropyrolysis reactor vessel (either in the hydropyrolysis reactor output or from the deoxygenating catalyst bed). In some cases, solid bed material removed from the pre-reactor, following one or more of these optional steps, may be returned to the hydropyrolysis reactor vessel. In other cases, deoxygenating catalyst removed from the hydropyrolysis reactor, following one or more of these optional steps, may be returned to the pre-reactor.

It may be desirable to pass the entire pretreating output, namely the entire pre-reactor vapor stream, which may have at least one improved characteristic as described herein, as a result of the pretreating, to the hydropyrolysis reactor. A representative, improved characteristics is a reduced solid-phase chloride content relative to that of the initial feedstock. In many cases, the yield of the pretreated feedstock, for example the yield of the total solid and/or vapor products of pretreating (e.g., in a pre-reactor) that is passed to hydropyrolysis, can represent a substantial amount, on a weight basis, of the total pretreating input (e.g., the total solid and/or vapor products that are input to the pretreating step, for example to the pre-reactor). The yield of the pretreated feedstock can be generally at least about 25% by weight (e.g., from about 25% to about 100% by weight), typically at least about 50% by weight (e.g., from about 50% to about 100% by weight), and often at least about 70% by weight (e.g., from about 70% to about 99% by weight).

Due to the diverse functions of the pre-reactor and wide-ranging characteristics of the biomass-containing feedstock, in addition to the number of possible types of solid bed material as described above, operating conditions in the pre-reactor may vary broadly and may include the ranges of temperatures and pressures described below with respect to the hydropyrolysis reactor. However, higher and lower temperatures are contemplated for some embodiments, for example representative temperatures may range generally from about 150° C. to about 650° C., and typically from about 260° C. to about 540° C., depending on the specific objective(s) of the pretreating step.

Other Pretreating Steps

As described above, aspects of the present invention are associated with processes for the effective conversion of MSW and other biomass-containing initial feedstocks that are poorer in quality, relative to feedstocks comprising exclusively biomass, and also more difficult to convert in processes comprising at least one hydropyrolysis step. In representative processes comprising pretreating the initial feedstock to produce a pretreated feedstock, the pretreated feedstock has at least one improved characteristic over the initial feedstock. The at least one improved characteristic may result from a pretreating step comprising devolatilization and/or hydropyrolysis in a pre-reactor as described above. Alternatively, the at least one improved characteristic may result from other steps (e.g., separation or classification steps) prior to hydropyrolyzing the pretreated feedstock and/or in some cases may result from steps performed in situ, i.e., within the hydropyrolysis reactor vessel. Thus, a number of pretreating steps, as an alternative to, or in combination with, those described above are possible.

The at least one improved characteristic may be selected from the group consisting of reduced non-biological material content (e.g., content of glass, metals, and metallic oxides, including all mineral forms), a higher temperature, a reduced average particle size, a reduced average particle aerodynamic diameter, an increased average particle surface area to mass ratio, a more uniform particle size, a reduced corrosive species content, a reduced hydropyrolysis catalyst poison content (e.g., reduced sodium), and a reduced hydroconversion catalyst poison content.

According to particular embodiments, the pretreating of the initial feedstock may comprise removing at least a portion of the non-biological materials. For example, the pretreated feedstock may have a reduced content, relative to the initial feedstock, of one or more of an impurity selected from the group consisting of (A) total chloride, (B) total plastics, (C), total glass, (D) total metals (with representative metals as defined above, in their elemental forms and/or present as compounds, e.g., in their oxide and mineral forms), and (E) combined total nitrogen and sulfur content. According to representative embodiments, the pretreated feedstock can have a content of one or more of (A), (B), (C), (D), and/or (E) that is reduced generally by at least about 10% by weight (wt-%) (e.g., from about 10% wt-% to about 99% wt-%), typically by at least about 25 wt-% (e.g., from about 25 wt-% to about 98 wt-%), and often by at least about 50 wt-% (e.g., from about 50 wt-% to about 95 wt-%) relative to that of the initial feedstock. According to various embodiments, the performance of the pretreating step may be characterized by any of the above-recited ranges of yields in combination with any of the above-recited ranges of reduction in one or more impurities selected from the group consisting of (A), (B), (C), (D), and (E) (e.g., a pretreated feedstock yield of at least about 70 wt-%, in combination with a reduction in total plastics in an amount from about 50 wt-% to about 95 wt-%).

Representative initial feedstocks, for example, can comprise total chloride (measured as elemental CO in an amount generally of at least about 200 parts per million (ppm) (e.g., from about 200 ppm to about 10,000 ppm), typically at least about 500 ppm (e.g., from about 500 ppm to about 7,500 ppm), and often at least about 1000 ppm (e.g., from about 1000 ppm to about 5,000 ppm). Particular feedstocks, such as algae grown in salt water, may have high levels of both chloride and sodium. In the environment of an integrated hydropyrolysis process, chloride can potentially form aqueous hydrochloric acid, and sodium can act as a poison that deactivates catalysts having hydrotreating activity, as described above. Algae can therefore significantly benefit from a pretreatment step in which levels of both chloride and sodium are reduced (e.g., according to the above-recited ranges of reduction in these impurities).

Representative plastics that may be present in initial feedstocks (e.g., MSW) include polyvinylchloride, polyolefins (e.g., polyethylene, including high density polyethylene (HDPE) and low density polyethylene (LDPE); polypropylene; polybutylene; and polyolefin co-polymers), polyesters (e.g., polyethylene terephthalate, polybutylene terephthalate, and polyester co-polymers), polyamides (e.g., polycaprolactam), poly(meth)acrylates, polyalkyl oxides (e.g., polyethylene oxide), polyvinyl alcohol homo- and copolymers (e.g., PVA foams, polyethylene vinyl alcohol), polyethylene glycol homo- and copolymers, polyoxamers, polysiloxanes (e.g., polydimethylsiloxane), polyethyloxazoline, and polyvinyl pyrrolidone, as well as hydrogels such as those formed from crosslinked polyvinyl pyrrolidinone and polyesters (e.g., polyvinyl pyrrolidone/cellulose esters and polyvinyl pyrrolidone/poly urethane), acrylic polymers (e.g., methacrylate) and copolymers, vinyl halide polymers and copolymers (e.g., polyvinyl chloride), polyvinyl ethers (e.g., polyvinyl methyl ether), polyvinylidene halides (e.g., polyvinylidene fluoride and polyvinylidene chloride), polyacrylonitrile, polyvinyl ketones, polyvinyl aromatics (e.g., polystyrene), polyvinyl esters (e.g., polyvinyl acetate), copolymers of vinyl monomers with each other and olefins (e.g., ethylene-methyl methacrylate copolymers, acrylonitrile-styrene copolymers, ABS resins and ethylene-vinyl acetate copolymers), alkyd resins, polycarbonates, polyoxymethylenes, polyimides, polyethers, epoxy resins, rayon, rayon-triacetate, and combinations thereof. Based on EPA information (see, for example, http//www.epa.gov/epawaste/nonhaz/municipal/index.htm) representative MSW may have plastics of any of the following types and/or amounts, based on the total amount of plastics: polyethylene terephthalate in the range from about 5% to about 25% by weight, high density polyethylene in the range from about 5% to about 30% by weight, polyvinyl chloride in the range from about 1% to about 10% by weight, low density polyethylene in the range from about 10% to about 35% by weight, polypropylene in the range from about 12% to about 40% by weight, and/or polystyrene in the range from about 3% to about 15% by weight.

Representative pretreating steps may involve the classification of particles of the initial feedstock into relatively higher and lower quality fractions, with the higher quality fraction having the at least one improved characteristic, as described above. According to a particular embodiment, for example, pretreating can comprise separating the initial feedstock into at least first and second fractions having contents of plastic that are lower and higher, respectively, compared to the content of plastic of the initial feedstock. The first fraction may therefore be substantially devoid of plastic (or otherwise have a reduction in total plastic content as described above), whereas the second fraction may comprise a substantial amount of plastic.

Representative particle separations or classifications that may be performed to provide fractions of solid particles of differing densities (e.g., by virtue of having differing contents of plastics) include separations utilizing, for example, contacting of the solid particles with separating liquids or the use of a centrifuge. Sorting of solid particles using a flowing gas stream (e.g., in a pneumatic separator) to provide fractions of differing densities or differing fluid dynamic properties in general, and thereby having at least one improved characteristic as described above, is also possible. Such sorting can be used, for example, to provide a pretreated feedstock having particles with a reduced average particle aerodynamic diameter, an increased average particle surface area to mass ratio, a more uniform particle size, and/or even a reduced non-biological material content. According to one representative embodiment, a pre-treating step may comprise contacting the biomass-containing feedstock with a flowing stream of gas (e.g., air) to separate less dense materials (e.g., wood- and/or paper-based particles) in a fraction with a desired characteristic (e.g., a reduced non-biological material content) for further processing. In the case of any separation based on density or other fluid dynamic property, the biomass-containing feedstock may be appropriately re-sized (e.g., chopped or ground) to form particles that are more amenable to a given separation. Different fractions of the biomass-containing feedstock, obtained from sorting, may be fed to a pre-reactor or hydropyrolysis reactor at differing locations and/or using different solid particle transport equipment.

According to some embodiments, the first fraction, having an improvement in at least one characteristic (e.g., a reduced total plastics content) may represent the pretreated feedstock that is subsequently subjected to the hydropyrolyzing step, whereas the second fraction may be subjected to further processing steps, recycled (at least partly) to the pretreating step, or used for a different purpose (e.g., plastics recovery and recycling). Alternatively, the second fraction may also be passed to the hydroprocessing reactor vessel, albeit at a different location and/or in a different manner, relative to the first fraction. For example, a representative process may comprise separately feeding the first and second fractions (e.g., having relatively lower and higher contents of total plastics, as described above) to the hydropyrolysis reactor vessel at separate locations (e.g., differing axial heights). The particular locations, to which the fractions are separately introduced, may be associated with localized conditions (e.g., temperature, gas velocity, solids concentration, average particle size) that are compatible with the compositions of the first and second fractions. According to other embodiments, the first and second fractions may be introduced to the hydropyrolysis reactor using introduction techniques that are compatible with the compositions of the first and second fractions. For example, a first fraction having a relatively lower content of total plastics may be fed to the hydropyrolysis reactor vessel through a cooled screw assembly, whereas the second fraction having a relatively higher content of total plastics may be fed to this reactor vessel through a heated extruder. In any of such embodiments, the first and second fractions may, in combination, represent all or a part of the initial feedstock, for example, these fractions in combination may represent a yield of the pretreated feedstock in the ranges given above (with some portion, e.g., a third fraction, that is not used in the hydropyrolysis reactor vessel).

Representative glasses that may be present in initial feedstocks (e.g., MSW) include E-glasses, boron-free E-glasses, S-glasses, R-glasses, AR-glasses, rare earth-silicate glasses, Ba—Ti-silicate glasses, nitrided glasses such as Si-Al-O—N glasses, A-glasses, C-glasses and CC-glasses. Each of these glass types are known in the art, particularly with respect to the compositions they embrace.

Representative initial feedstocks can comprise metals such as Li, Be, Na, Mg, Al, Si, P, K, Ca, Ti, V, Cr, Mn, Fe, Co, Ni, Cu, Zn, Mo, Sn, W, Pb, and/or Hg that are present in elemental form or as metal compounds such as metal oxides, including all mineral forms. These metals may be present in the initial feedstock in a combined amount of generally at least about 0.1% by weight (wt-%) (e.g., from about 0.1 wt-% to about 10 wt-%), typically at least about 0.5 wt-% (e.g., from about 0.5 wt-% to about 7.5 wt-%), and often at least about 1 wt-% (e.g., from about 1 wt-% to about 5 wt-%). The above ranges with respect to the content of metals in the initial feedstock are also applicable to the content of ash. The ash content refers to the percentage by weight of the initial feedstock that does not combust at a temperature of 750° C. The ash is generally in the form of metallic oxides (e.g., silica), and represents a specific type of non-biological material that is present in biomass generally and consequently also present in biomass-containing feedstocks such as MSW, but often at a higher concentration than in the biomass portion of the feedstock alone.

Initial feedstocks can comprise a total combined amount of nitrogen and sulfur (measured as total elemental N and S) of at least about 100 ppm (e.g., from about 100 ppm to about 30,000 ppm), typically at least about 500 ppm (e.g., from about 500 ppm to about 25,000 ppm), and often at least about 1000 ppm (e.g., from about 1000 ppm to about 20,000 ppm). According to various embodiments, representative initial feedstocks can have any of the above-recited ranges of non-biological material, total chloride, total ash, and/or total N and S, in combination (e.g., at least about 5 wt-% of non-biological material and from about 1000 ppm to about 5000 ppm total chloride).

Solid sorbents in the pre-reactor, or otherwise used in situ in the hydropyrolysis reactor vessel, may be used for scavenging corrosive species and/or species that negatively impact the activity of the deoxygenating catalyst and/or hydroconversion catalyst. According to particular embodiments, the pretreated feedstock has an improved characteristic of a reduced content of total chloride, a reduced content of total metals, or a reduced content of both total chloride and total metals, and the step of pretreating comprises contacting the initial feedstock with a solid sorbent under pretreating conditions whereby chloride and/or metals present in the initial feedstock are adsorbed onto the solid sorbent. Suitable sorbents having both capacity for adsorbing chloride and the ability to withstand elevated temperatures associated with devolatilization and/or pyrolysis in the pre-reactor and/or hydropyrolysis reactor, include, for example, calcium carbonate ($CaCO_3$) and other minerals containing basic anions such as carbonate and hydroxide. Such solid sorbents may be suitable in a pre-reactor or otherwise in the hydropyrolysis reactor to provide the improved characteristics of reduced total chloride and/or reduced total metals (e.g., reduced sodium) in situ.

According to an alternative embodiment, the biomass-containing feedstock may be subjected to a simple leaching step (e.g., by contacting it with an aqueous solution under batch conditions or with continuous flow of the solution) to remove water-soluble chlorides and/or other potentially corrosive or detrimental species. The resulting pretreated feedstock obtained in this manner may have an improved characteristic of reduced total chloride and/or reduced total metals (e.g., present in the initial feedstock in the form of water-soluble metal salts). Such a pretreated feedstock may be dried prior to hydropyrolysis or otherwise introduced into the hydropyrolysis reactor without drying, or even introduced in a slurry form. The pretreated feedstock may otherwise be introduced in dry form, water-saturated form, or slurry form, to a pre-reactor as described herein, upstream of a hydropyrolysis reactor. Any aqueous effluent obtained from such a leaching step may then be contacted under appropriate conditions (e.g., ambient conditions of temperature and pressure) with a suitable ion exchange resin or other solid sorbent, having the capacity to remove the leached, water-soluble species and purify the aqueous effluent.

In a particular embodiment in which the content of ash or other non-biological material is reduced in the pretreated feedstock relative to that of the initial feedstock, the step of pretreating comprises devolatilizing the initial feedstock in a fluidized bed, with the removal of non-biological material at one or more drawoff locations corresponding to one or more axial heights in the fluidized bed. Therefore, to the extent that a fluidized bed of a pre-reactor or hydropyrolysis reactor can act to separate or classify different types of solid particles (e.g., particles having different densities) into regions within the fluidized bed, the removal of solid particles at selected drawoff locations (e.g., where particles having a given desired or undesired characteristic are selectively enriched) advantageously allows for the selective removal of particles having such desired or undesired characteristic(s). For example, the selective removal of particles having undesired characteristics such as a high ash or other non-biological material content provides a pretreated feedstock having the improved characteristic of reduced ash content or reduced non-biological material content, remaining in the reactor. Alternatively, particles having a desired characteristic such as a more uniform particle size, may be selectively removed from the fluidized bed within the reactor to provide the pretreated feedstock. According to one representative method of classifying or concentrating different types of solid particles (e.g., solid particles of differing densities and/or differing aerodynamic diameters), differing superficial gas velocities with the pre-reactor vessel may be used. These differing gas velocities can be achieved by varying the cross-sectional area at differing axial heights, while maintaining a fixed gas volumetric flow rate, and/or otherwise by adding (injecting) gas at differing axial locations while maintaining a fixed cross-sectional area. A combination of varying cross-sectional area and gas injection at a given axial height may also be used.

The removal of non-biological material from a particular location or locations can also prevent the accumulation of such material, which can lead to disruption in the action and function of the bed of solid material. According to some embodiments, the removal of solid materials can also occur upstream of the pre-reactor (e.g., by physical sorting or the use of a flowing gas separation systems, such as a pneumatic separator), within the pre-reactor, within the hydropyrolysis reactor vessel (in situ), or even downstream of the hydropyrolysis reactor vessel but upstream of a hydroconversion reactor vessel, resulting in the same or a similar effect of reducing the content of a non-biological material in the initial feedstock (in this case the content of non-biological material in the feedstock to any of the pre-reactor vessel, the hydropyrolysis reactor vessel, or possibly even the hydroconversion reactor vessel).

A number of other types of separations and classifications may be performed to adjust the fluid dynamic properties of the initial feedstock, prior to or during its use in a fluidized bed hydropyrolysis reactor vessel. Therefore, for example, improved characteristics of a pretreated feedstock, such as a reduced average particle size, a reduced average particle aerodynamic diameter, an increased average particle surface area to mass ratio, and/or a more uniform particle size, may be beneficial in maintaining good fluidization parameters (e.g., in terms of the superficial gas velocity needed for fluidization) of the pretreated feedstock. The improvement of the feedstock along any of these lines may also have the added benefit of upgrading MSW, algae, *lemna*, or other biomass-containing feedstock in terms of its composition. For example, increasing the average particle surface area to mass ratio can refer to an aerodynamic separation in which metallic objects and other particles of a low surface area to mass ratio are selectively removed in the pretreated feedstock relative to the initial feedstock, leaving an increased content of higher surface area to mass ratio particles, such as wood particles, in the pretreated feedstock. In this manner, a separation resulting in increasing the average particle surface area to mass ratio, or improving any of the other fluid dynamic properties as described above, may have the added benefit of reducing the content of non-biological materials in the pretreated feedstock.

The adjustment of fluid dynamic properties of particles can, according to some embodiments, occur in situ (e.g., within the hydropyrolysis reactor vessel, or within a pre-reactor vessel used to devolatilize the feedstock), particularly with respect to disrupting the formation of agglomerated particles of the biomass-containing feedstock. Particle agglomerates can form, for example, as a result of a high content of plastics that, when softened or melted, can coat particles of the feedstock and/or other solid particles, causing them to stick together (agglomerate). The improved characteristics of reduced average particle size and/or more uniform particle size, as described above, as well as other improved fluid dynamic properties, can, according to some embodiments, refer to improvements relative to the initial feedstock in its agglomerated or partially agglomerated state under processing conditions in the pre-reactor vessel or hydropyrolysis reactor vessel. The improved characteristic, as a result of taking positive steps to either break agglomerated feedstock particles or otherwise prevent the formation of such agglomerates in the first place, may therefore be based on the improvement over the hypothetical situation that would occur in the absence of such steps. Accordingly, in some embodiments, the step of pretreating an initial feedstock to produce a pretreated feedstock having at least one improved characteristic over the initial feedstock may be satisfied by remediation (e.g., agitation to break particle agglomerates or prevent their formation) that is performed in situ, i.e., in the pre-reactor vessel or hydropyrolysis reactor vessel.

More generally, such remediation steps can be used to break agglomerates, or prevent the formation of agglomerates, of any interacting solid particles within the pre-reactor or hydropyrolysis reactor, including agglomerates of (i) particles of feedstock, (ii) particles of feedstock with particles of solid bed material, particles of catalyst, and/or particles of char, (iii) particles of solid bed material, (iv) particles of catalyst, and/or (v) particles of char. According to particular embodiments, the pretreating and/or hydropyrolyzing steps may be operated with continuous, intermittent, or localized high agitation conditions that reduce the formation of any of these types of agglomerates. Such high agitation conditions, for example, can reduce the formation of agglomerates of particles of deoxygenating catalyst in the hydropyrolysis reactor vessel. The use of specific gas velocities may be tailored to the properties of the agglomerates (e.g., the average particle size and/or particle size distribution of agglomerates of particles of the deoxygenating catalyst in the hydropyrolysis reactor vessel) that are broken apart, or that otherwise form in the absence of the high agitation conditions. According to some embodiments, the use of high fluidization gas velocities alone may be sufficient to break particle agglomerates or prevent their formation and thereby achieve the desired degree of remediation. Otherwise, the selected size ranges of bed material and/or feedstock may be used, such that, under processing conditions, interactions of the selected size ranges of the particles promote the desired degree of remediation.

According to particular embodiments, high agitation conditions, effective for breaking particle agglomerates or otherwise preventing their formation, can include localized use, either continuously or intermittently, of a gas velocity that significantly exceeds (e.g., by a factor of at least about 2, at least about 5, or at least about 10) the overall superficial velocity of fluidizing gas in the pre-reactor vessel or the hydropyrolysis reactor vessel, or otherwise the overall average superficial velocity of fluidizing gas in the fluidized particle beds of these respective reactor vessels (e.g., in the case of a reactor having a varying cross-sectional area). For example, the overall superficial velocity of the fluidizing gas may be calculated as the total volumetric flow rate of the fluidizing gas, divided by the average cross-sectional area of the reactor or of the associated, solid particle bed, which may be a fluidized bed, within the reactor vessel. Localized, high gas velocities can be created using gas injection nozzles in the desired areas where agglomerated particles are susceptible to formation and/or breakage. High agitation conditions can also be enhanced using internal structures (e.g., baffles or impact plates) in combination with gas injection nozzles, which structures and nozzles may be positioned in combination to subject agglomerated particles to impact forces sufficient for their breakage and/or the prevention of agglomeration from the outset, or at least the prevention of the further growth of formed agglomerates.

Hydropyrolyzing the Pre-Reactor Vapor or Other Pretreated Feedstock

Subsequent to contacting the biomass-containing feedstock with a hydrogen-containing gas (or other pre-reactor gas as described above), in a pre-reactor vessel containing a solid bed material, representative processes can include hydropyrolyzing at least a portion (i.e., some or all) of the pre-reactor process vapor stream, as described above, or otherwise hydropyrolyzing at least a portion of a pretreated feedstock, as described above.

In embodiments in which a pre-reactor is used for pretreatment, the pre-reactor may effect devolatilization and/or at least some pyrolysis (e.g., hydropyrolysis) of the biomass-containing feedstock. In general, deoxygenation reactions will not occur to any significant extent, as these are reserved primarily for the hydropyrolysis reactor vessel and a subsequent hydroconversion reactor vessel (if used). Those skilled in the art, consulting the present disclosure, will appreciate the operating conditions in the pre-reactor required to achieve a given extent of devolatilization and/or hydropyrolysis, including temperature, hydrogen partial pressure, and feedstock residence time. Due to the significant extent of deoxygenation in the hydropyrolysis reactor vessel and optional hydroconversion reactor vessel, the associated hydropyrolyzing and hydroconverting steps are normally both exothermic, i.e., the reactions associated with these steps involve a net generation of heat, despite the pyrolysis reactions in isolation being endothermic. In contrast, due to the relatively low extent of hydroconversion (or in some cases no hydroconversion), occurring in the pre-reactor vessel, the devolatilization and optional pyrolysis in the step of devolatilizing is generally endothermic, i.e., the reactions associated with this step involve a net consumption of heat. In order to effectively manage the reaction thermodynamics of both the pre-reactor and hydropyrolysis reactor vessel, the temperature of the pre-reactor vapor stream (or portion thereof that is introduced into the hydropyrolysis reactor) may be adjusted upward or downward, to meet the temperature requirements of the hydropyrolysis reactor. For example, according to one embodiment, the temperature of the pre-reactor vapor stream or portion thereof is adjusted to the mean temperature, or to within about 10° C. of the mean temperature, of the hydropyrolysis reactor over a short time period (e.g., in less than about 2 minutes or even in less than about 1 minute).

In view of the above considerations, if a catalyst is used as the solid bed material in the pre-reactor, suitable catalysts for such purpose may include those having a relatively lower deoxygenation activity, compared to catalysts used in the hydropyrolysis reactor vessel and/or hydroconversion reactor vessel. According to some embodiments, spent or partially spent catalyst from the hydropyrolysis reactor and/or hydroconversion reactor (e.g., following some period of use in hydropyrolyzing and/or hydroconversion steps) may advantageously be used in the pre-reactor, to provide a catalyst having a desired level of deoxygenation activity. According to specific embodiments, therefore, the solid bed material in the pre-reactor vessel may comprise, consist essentially of, or consist of spent or partially spent deoxygenating catalyst previously used in the hydropyrolysis reactor vessel and/or spent or partially spent hydroconversion catalyst previously used in the hydroconversion reactor vessel.

According to particular embodiments, therefore, the solid bed material in the pre-reactor may comprise a spent or partially spent deoxygenating catalyst transferred from the hydropyrolysis reactor, a spent or partially spent hydroconversion catalyst transferred from the hydroconversion reactor, or a combination thereof. For example, the spent or partially spent catalyst(s) may be continuously removed from one or both of these reactor vessels and fed to the pre-reactor vessel to derive additional, beneficial use from the catalyst(s) in pretreating the feedstock. It should be appreciated that, in some embodiments, the catalyst particle sizes for the pre-reactor, hydropyrolysis reactor, and hydroconversion reactor are not necessarily compatible, particularly in cases of the different reactors operating under different regimes of fluidized bed (e.g., for the pre-reactor and/or hydropyrolysis reactor) and fixed bed (e.g., for the hydroconversion reactor) processing. Therefore, the use of spent or partially spent catalyst in the pre-reactor vessel may require re-sizing, for example by grinding or crushing to achieve an average particle size that is suitable for use in the pre-reactor.

The references to "spent or partially spent" deoxygenating catalysts refer to catalysts having activity for deoxygenation that is reduced, relative to the same catalyst in its unused (fresh) state. A loss of deoxygenation activity can be verified by comparative testing in a controlled environment, in which the reaction temperature required to achieve a given extent of deoxygenation of a test feedstock provides a measure of catalyst activity. A higher reaction temperature is indicative of lower activity. The condition of a deoxygenating catalyst that results in an at least partial loss of activity, rendering it spent or partially spent and therefore suitable in some embodiments for use in a pre-reactor, may result from coking, contamination with impurities (e.g., metals), or another condition leading to activity loss. The condition may be reversible (e.g., through catalyst regeneration and/or catalyst sulfiding) or irreversible.

The hydropyrolyzing step can occur in a hydropyrolysis reactor vessel containing hydrogen and a deoxygenating catalyst, in order to produce a hydropyrolysis reactor output comprising at least one non-condensable gas, a partially deoxygenated hydropyrolysis product and char particles. In many cases, the hydropyrolysis reactor output will comprise, as non-condensable gases, one or more of $H_2$, CO, $CO_2$, $CH_4$, $C_2H_6$, and $C_2H_4$. However, depending on the methanation activity and water-gas shift conversion activity of the deoxygenating catalyst, more or less methane ($CH_4$) will be produced at the expense of CO, $CO_2$, and $H_2$. In highly methanating environments, it may be possible for the hydropyrolysis reactor output to comprise little or no CO and/or $CO_2$ as non-condensable gases (e.g., in an amount of less than 5 vol-%, or even less than 1 vol-%, of all non-condensable gases) but nevertheless still comprise one or more of $H_2$, $CH_4$, $C_2H_6$, and $C_2H_4$.

In general, therefore, the hydropyrolysis reactor output will comprise (i) $CO_2$, CO and other non-condensable or low molecular weight gases (e.g., $C_1$-$C_3$ hydrocarbon gases, including both paraffinic and olefinic hydrocarbons), together with any stoichiometric excess of $H_2$ that is not consumed in the hydropyrolysis reactor, (ii) a partially deoxygenated hydropyrolysis product (e.g., in the form of a condensable vapor), and (iii) solid char particles. As used herein, the "partially deoxygenated hydropyrolysis product" of the hydropyrolyzing step may comprise oxygenated hydrocarbons (e.g., derived from cellulose, hemicellulose, and/or lignin) that may be subjected to more complete deoxygenation (e.g., to produce hydrocarbons and remove the oxygen in the form of CO, $CO_2$, and/or water) in a subsequent hydroconversion process. The term "partially deoxygenated hydropyrolysis product," however, does not preclude the presence of some amount of hydrocarbons (e.g., aromatic hydrocarbons such as alkylbenzenes) that are fully deoxygenated and thus cannot be further deoxygenated. The partially deoxygenated hydropyrolysis product, according to some embodiments, will generally contain a lower oxygen content compared to conventional bio-oils obtained from pyrolysis in the substantial absence of any deoxygenation reactions. This is due to the extent of catalytic deoxygenation reactions occurring within the hydropyrolysis reactor in the presence of hydrogen. Representative oxygen contents of the partially deoxygenated hydropyrolysis product are generally in the range from about 2% to about 30% by weight, and typically in the range from about 5% to about 25% by weight.

As in the case of the pre-reactor vessel, described above, the hydropyrolysis reactor vessel may contain a fluidized bed, but in this case including the deoxygenating catalyst. Other solids in this fluidized bed may include the pretreated feedstock or solids present in the pre-reactor vapor stream, or otherwise present in the portion of the pre-reactor vapor stream that is passed from the pre-reactor vessel to the hydropyrolysis reactor vessel. Accordingly, the hydropyrolyzing step may be performed using a fluidized bed of the deoxygenating catalyst, and the hydropyrolysis fluidization gas may comprise at least the portion of the pre-reactor process vapor stream that is hydropyrolyzed, subsequent to being generated in the pre-reactor vessel. Representative superficial gas velocities for the hydropyrolysis fluidization gas range generally from about 0.03 meters/second (m/s) to about 6 m/s, typically from about 0.15 m/s to about 3 m/s, and often from about 0.3 m/s to about 1.5 m/s.

Following the hydropyrolyzing step, representative processes may further comprise removing all or substantially all of the char particles and/or other solid particles (e.g., catalyst fines) from the hydropyrolysis reactor output to provide a purified hydropyrolysis reactor vapor stream having a reduced char content. The removal of char particles, such as those which may be entrained in the pre-reactor vapor stream, may be particularly important in processes in which the products of hydropyrolysis, including the purified hydropyrolysis product vapor stream or a portion thereof, are subjected to a fixed bed catalytic conversion process. In such cases, the removal of fine char particles prevents problems associated with premature plugging of the fixed bed as the char particles become trapped within the voids of the fixed catalyst bed. As defined herein, the removal of substantially all of the char particles means that at least 99% by weight of the char particles in the hydropyrolysis reactor output are excluded from the purified hydropyrolysis product vapor stream. According to further embodiments, at 99.9% by weight, or at least 99.99% by weight, of the char particles are excluded.

Representative processes may further comprise hydroconverting at least a portion of the purified hydropyrolysis reactor vapor stream in a hydroconversion reactor vessel containing hydrogen and a hydroconversion catalyst, producing a hydroconversion reactor output. The purified hydropyrolysis reactor vapor stream, like the hydropyrolysis reactor output, may include condensable gases (e.g., water vapor; $C_3H_8$, $C_3H_6$, and higher molecular weight hydrocarbons; and oxygenated hydrocarbons such as phenols) as well as non-condensable gases (e.g., $H_2$, CO, $CO_2$, $CH_4$, $C_2H_6$, and $C_2H_4$). Generally, the purified hydropyrolysis reactor vapor stream, or at least a portion thereof, will be passed completely in the vapor phase to a subsequent hydroconverting step, without intermediate condensing of any portion of this stream. However, intermediate condensing with re-heating may also be possible, for example, to selectively condense unwanted components of relatively low volatility (relatively high boiling point), optionally providing a liquid condensate "wash" for removing char and/or other solid particles (e.g., catalyst fines). In other embodiments, the purified hydropyrolysis reactor vapor stream may be partially condensed and passed as a mixed vapor and liquid phase to the subsequent hydroconverting step. Partial condensation may occur, for example, when heat is recovered from the purified hydropyrolysis reactor vapor stream (e.g., by heat exchange with a cooler stream), or when heat is otherwise lost to the environment.

As is apparent from the above description, all or a portion of the purified hydropyrolysis reactor vapor stream exiting the hydropyrolysis reactor (and obtained following the substantial removal of all char particles) may be subjected to the subsequent hydroconverting step. Between the steps of hydropyrolyzing and hydroconverting, therefore, the purified hydropyrolysis reactor vapor stream may, by separation or reaction, be enriched with respect to one or more desired components and/or depleted with respect to one or more undesired components. The purified hydropyrolysis reactor vapor stream may also be mixed prior to or during the hydroconverting step with one or more additional streams. Accordingly, unless otherwise noted, the step of hydroconverting at least a portion of the purified hydropyrolysis reactor vapor stream is meant to encompass such intermediate steps as separation, reaction, and/or mixing. In some embodiments, however, the purified hydropyrolysis reactor vapor stream, or portion thereof, may be subjected to the hydroconverting step, without an intermediate step of being enriched with respect to one or more desired components and/or depleted with respect to one or more undesired components, by separation or reaction (e.g., in the case of partial condensation, which may serve to remove some of the solid particles). For example a portion of the purified hydropyrolysis reactor vapor stream may be split from the entire effluent of the hydropyrolysis reactor (and following the substantial removal of all char particles), with little or no change in its composition. Likewise, the purified hydropyrolysis reactor vapor stream, or portion thereof, may be subjected to the hydroconverting step, without being mixed prior to or during the hydroconverting step with one or more additional streams. However, in many cases it will be desirable to mix the purified hydropyrolysis reactor vapor stream or portion thereof with hydrogen or a hydrogen-containing gas stream that provides additional hydrogen (beyond that contained in the purified hydropyrolysis reactor vapor stream or portion thereof) for hydroconversion as described below.

Suitable catalysts for use in the pre-reactor (in the case of the solid bed material having catalytic activity), hydropyrolysis reactor, and/or hydroconversion reactor will in general have activity for hydroprocessing of the biomass-containing feedstock, the pretreated feedstock, and/or their hydropyrolysis reaction products, in an environment of suitable hydrogen partial pressure, temperature, and other conditions as described herein. Hydroprocessing is meant to encompass broadly a number of possible reactions, including hydrotreating, hydrocracking, hydroisomerization, and combinations thereof, as well as possible oligomerization occurring under a hydrogen-rich environment. Representative hydroprocessing catalysts include those comprising at least one Group VIII metal, such as iron, cobalt, and nickel (e.g., cobalt and/or nickel) and at least one Group VI metal, such as molybdenum and tungsten, on a high surface area support material such as a refractory inorganic oxide (e.g., silica, alumina, titania, and/or zirconia). A carbon support may also be used. A representative catalyst having hydroprocessing activity therefore comprises a metal selected from the group consisting of nickel, cobalt, tungsten, molybdenum, and mixtures thereof (e.g., a mixture of nickel and molybdenum), deposited on any of these support materials, or combinations of support materials. The choice of support material may be influenced, in some cases, by the need for corrosion resistance in view of the possibility of forming condensed aqueous acids, for example acids known to be present in bio-oils obtained from conventional biomass pyrolysis and/or acids obtained from the hydrogenation of impurities in the biomass-containing feedstock (e.g., chlorides), as described herein.

The Group VIII metal is typically present in the hydroprocessing catalyst in an amount ranging from about 2 to about 20 weight percent, and normally from about 4 to about 12 weight percent, based on the volatile-free catalyst weight. The Group VI metal is typically present in an amount ranging from about 1 to about 25 weight percent, and normally from about 2 to about 25 weight percent, also based on the volatile-free catalyst weight. A volatile-free catalyst sample may be obtained by subjecting the catalyst to drying at 200-350° C. under an inert gas purge or vacuum for a period of time (e.g., 2 hours), so that water and other volatile components are driven from the catalyst.

Other suitable hydroprocessing catalysts include zeolitic catalysts, as well as noble metal catalysts where the noble metal is selected from palladium and platinum. Two or more hydroprocessing catalysts of the same or different type may be utilized in the pre-reactor vessel, the hydropyrolysis reactor vessel, and/or the hydroconversion reactor vessel or combination of hydroconversion zone vessels (described more fully below) that provide the substantially fully deoxygenated hydrocarbon liquid. For example, different hydroprocessing catalysts may be useful for catalyzing deoxygenation (e.g., in a hydropyrolysis reactor vessel) or hydrocracking (e.g., in a hydroconversion reactor vessel). In some cases, the catalyst and conditions in a hydroconversion reactor vessel may be chosen for their effectiveness in catalyzing hydrocracking, thereby enhancing the yield of hydrocarbons of a desired molecular weight (e.g., gasoline boiling-range hydrocarbons). The catalyst and conditions in a hydroconversion reactor vessel may also be chosen for their effectiveness in catalyzing hydroisomerization, thereby enhancing the yield of isoparaffins, which can improve the quality of the substantially fully deoxygenated hydrocarbon liquid, or at least a diesel fuel boiling-range fraction thereof, in terms of reducing its pour point and cloud point temperatures.

Representative hydrocracking catalysts include those described in U.S. Pat. Nos. 6,190,535 and 6,638,418, incorporated by reference herein with respect to their disclosures of these catalysts. Other suitable hydrocracking catalysts include those comprising a metal selected from the group consisting of iron, nickel, cobalt, tungsten, molybdenum, vanadium, ruthenium, and mixtures thereof, deposited on a zeolite. Representative zeolites for hydrocracking catalyst supports may include beta zeolite, Y zeolite and MFI zeolite. The structures of Y zeolite and MFI zeolite are described, and further references are provided, in Meier, W. M, et al., *Atlas of Zeolite Structure Types*, $4^{th}$ Ed., Elsevier: Boston (1996). Representative hydroisomerization catalysts include those described in US 2009/0077866 as "isomerization catalysts." The contents of US 2009/0077866 with respect to such isomerization catalysts are hereby incorporated by reference.

As is understood in the art, the term "hydrotreating catalyst" encompasses catalysts having activity for any of hydrodeoxygenation of organic oxygen-containing molecules to form water; decarbonylation or decarboxylation of organic oxygen-containing molecules to form CO and $CO_2$, respectively; hydrodenitrification of organic nitrogen-containing molecules; and/or hydrodesulfurization of organic sulfur-containing molecules. Representative catalysts useful in the pre-reactor vessel, hydropyrolysis reactor vessel, and/or at least one hydroconversion reactor vessel, therefore include hydrotreating catalysts as described in U.S. Pat. Nos. 6,190,535 and 6,638,418, incorporated by reference herein with respect to their disclosures of these catalysts. In a representative embodiment, the catalytically active metals (e.g., nickel and molybdenum) may be the same in catalysts that are used in two or more of the pre-reactor vessel, hydropyrolysis reactor vessel, and at least one hydroconversion reactor vessel, with the support materials for the catalysts also being the same. Alternatively, the support materials may vary with respect to their acidity, in order to provide varying degrees of hydrocracking functionality. For example, the support material used for a catalyst in the hydropyrolysis reactor vessel may be a relatively low acidity material (e.g., an alumina-phosphorous mixture) while the support material used for a catalyst in the hydroconversion reactor vessel may be a relatively high acidity material (e.g., an amorphous or zeolitic silica-alumina), thereby improving the tendency of the hydroconversion reaction zone to catalyze cracking reactions, if a reduction in the molecular weight of hydrocarbons in the substantially fully deoxygenated liquid hydrocarbon product is desired. Acidity may be determined, for example in units of moles of acid sites per gram of catalyst, by temperature programmed desorption (TPD) of a quantity of ammonia, from an ammonia-saturated sample of the catalyst, over a temperature from 275° C. to 500° C., which is beyond the temperature at which the ammonia is physisorbed. The quantity of acid sites therefore corresponds to the number of moles of ammonia that is desorbed in this temperature range.

Representative processes may further comprise recovering a substantially fully deoxygenated hydrocarbon liquid and a gaseous mixture from the hydroconversion reactor output. In this regard, the hydroconversion reactor output may comprise condensable gases from which the substantially fully deoxygenated hydrocarbon liquid (which may include one, or a mixture of, substantially fully deoxygenated higher value liquid products) may be condensed and then separated using one or more separation processes including phase separation from a condensed aqueous phase and/or distillation. For example, phase separation may be used to recover the substantially fully deoxygenated hydrocarbon liquid from an aqueous phase comprising primarily condensed water. Distillation may then be used, for example, to obtain substantially fully deoxygenated higher value liquid products such as gasoline boiling-range and/or diesel fuel boiling-range hydrocarbon fractions. The designation of "substantially fully deoxygenated" in reference to hydrocarbon liquids, as well as higher value liquid products that may be obtained from these liquids (e.g., by fractionation) can refer to a total oxygen content of less than about 2% by weight, less than about 1% by weight, less than about 5000 ppm by weight, less than about 2000 ppm by weight, or even less than about 1000 ppm by weight. The low oxygen content renders the substantially fully deoxygenated hydrocarbon liquid easily phase separable from condensed water. Advantageously, any net condensed water produced in an integrated process will have a low content of dissolved total organic carbon (TOC), generally less than about 5000 wt-ppm, typically less than about 2000 wt-ppm, and often less than about 500 wt-ppm.

The gaseous mixture that is recovered from the hydroconversion reactor output will generally include non-condensable gases (e.g., $H_2$, CO, $CO_2$, $CH_4$, $C_2H_6$, and $C_2H_4$) and optionally a minor amount of condensable gases (e.g., $C_3$ and heavier hydrocarbons), depending on the conditions (i.e., temperature and pressure) under which the gaseous mixture is separated from the hydroconversion reactor output (e.g., using a gas-liquid separator or a stripper to achieve one or more theoretical equilibrium liquid-vapor separation stages). To the extent that this gaseous mixture contains CO, $CO_2$, and hydrocarbons, at least a portion thereof may be subjected to steam reforming, in order to produce reformed hydrogen and improve the overall hydrogen balance of the integrated process. This can advantageously decrease or even eliminate the need for imported hydrogen obtained from the conventional reforming of hydrocarbons. According to some embodiments, therefore, a decreased reliance on petroleum-based carbon sources can reduce the overall carbon footprint of the transportation fuel fractions separated from the substantially fully deoxygenated hydrocarbon liquid, based on a lifecycle assessment of the greenhouse gas (GHG) emission value, according to U.S. government accounting practices.

Conditions in the hydropyrolysis reactor include a temperature generally from about 300° C. to about 600° C., typically from about 400° C. to about 500° C., and often from about 410° C. to about 475° C. The weight hourly space velocity (WHSV) of the hydropyrolysis reactor, calculated as the mass flow rate of the biomass-containing feedstock or pretreated feedstock divided by the catalyst inventory of the hydropyrolysis reactor vessel, is generally from about 0.1 $hr^{-1}$ to about 10 $hr^{-1}$, typically from about 0.5 $hr^{-1}$ to about 5 $hr^{-1}$, and often from about 0.8 $hr^{-1}$ to about 2 $hr^{-1}$. Conditions in the hydroconversion reactor (or any of possibly two or more hydroconversion reactors, if used) include a temperature generally from about 200° C. to about 475° C., typically from about 260° C. to about 450° C., and often from about 315° C. to about 430° C. The weight hourly space velocity (WHSV) of the hydroconversion reactor, calculated as the mass flow rate of the feed to the hydroconversion reactor (e.g., a purified vapor stream obtained from the hydropyrolysis reactor) divided by the catalyst inventory of the hydroconversion reactor vessel, is generally from about 0.01 $hr^{-1}$ to about 5 $hr^{-1}$, typically from about 0.05 $hr^{-1}$ to about 5 $hr^{-1}$, and often from about 0.1 $hr^{-1}$ to about 4 $hr^{-1}$.

Further representative operating conditions for hydropyrolysis and hydroconversion and their significance are described in greater detail below. Some representative conditions are also described in U.S. patent application publication nos. US 2010/0251600, US 20100256428, and US 2013/0338412, the contents of which are hereby incorporated by reference in their entireties.

As described in these publications, catalysts and operating conditions in both the hydropyrolysis and hydroconversion reactor vessels may be adjusted such that the deoxygenation reactions, which remove oxygen from biomass-derived molecules (e.g., cellulose, hemicellulose, and/or lignin), are balanced between hydrodeoxygenation, which yields $H_2O$, and the non-condensable gas-yielding reactions of decarbonylation and decarboxylation, which yield CO and $CO_2$, respectively. Advantageously, the production of a significant amount of these gases from biomass oxygen in turn allows for their subsequent use, in reforming of gaseous mixtures (e.g., from the hydropyrolysis reactor output and/or the hydroconversion reactor output) in which they are contained (e.g., together with light hydrocarbons), to generate some or all of the hydrogen required in the integrated process. In the case of the use of a pre-reactor as described herein, the hydrogen required for the integrated process can include the amount of hydrogen consumed in the pre-reactor, for example if a hydrogen-containing gas is used as a pre-reactor fluidizing gas, for carrying out devolatilization and/or hydropyrolysis.

According to representative embodiments, at least about 20% of the oxygen content of the biomass-containing feedstock, or at least about 20% of the oxygen content of the pretreated feedstock as described herein, is converted to CO and $CO_2$ following hydropyrolysis and hydroconversion, and optionally also following pretreating, including devolatilization. Representative ranges of conversion of the oxygen content of the biomass-containing feedstock or pretreated feedstock to CO and $CO_2$ following these steps are from about 20% to about 80%, from about 30% to about 70%, and from about 40% to about 60%, in order to achieve a proper balancing between hydrodeoxygenation and decarbonylation/decarboxylation, as described above. Representative ranges of conversion of this oxygen content to $H_2O$ following these steps are at most about 80%, from about 20% to about 80%, from about 30% to about 70%, and from about 40% to about 60%. These ranges of feedstock or pretreated feedstock oxygen content being converted following hydropyrolysis and hydroconversion are not necessarily representative of the final disposition of biomass oxygen content following downstream conversion by steam reforming, in which the $H_2O$ formed in hydropyrolysis and/or hydroconversion may be consumed. According to some embodiments, the final disposition of feedstock or pretreated feedstock oxygen content to CO and $CO_2$, following steam reforming, may be significantly higher. For example, according to some embodiments in which the process is integrated with steam reforming, at least about 90%, and in some cases at least about 95%, of the feedstock or pretreated feedstock oxygen content may be used to form CO and/or $CO_2$. It should also be noted, however, that, according to other embodiments, methanation of CO and/or $CO_2$ to form methane will serve to reduce these amounts.

According to some embodiments, the desired balancing of biomass oxygen conversion to liquid and gaseous products may be achieved using moderate reaction conditions, such as moderate levels of pressure and/or hydrogen partial pressure in the hydropyrolysis and/or hydroconversion reactors, as moderate levels of pressure and/or hydrogen partial pressure have been found to result in relatively greater yields of CO and $CO_2$, at the expense of $H_2O$, compared to the use of higher levels of pressure and/or hydrogen partial pressure in conventional hydroprocessing operations (e.g., conventional hydrotreating and/or hydrocracking of petroleum fractions). Representative pressures and/or hydrogen partial pressures in the hydropyrolysis and hydroconversion reactors (expressed as gauge pressures) may be independently less than about 55 barg (e.g., from about 7 barg to about 55 barg, from about 14 barg to about 41 barg, or from about 21 barg to about 38 barg).

According to some embodiments, it may be desirable for the hydropyrolysis reactor pressure to be substantially the same as that of the hydroconversion reactor, for example in the case in which the hydropyrolysis reactor vessel is operated at a pressure only slightly above that of the hydroconversion reactor vessel (e.g., at most about 3.5 bar above, or at most about 2 bar above), as needed to at least overcome the pressure differential between these vessels during normal operation. Likewise, the pre-reactor vessel, if used, may be operated at a pressure only slightly above that of the hydropyrolysis reactor vessel (e.g., at most about 3.5 bar above, or at most about 2 bar above). In this manner, costs associated with the compression of gas streams, (e.g., recycled hydrogen-containing streams) may be reduced. According to representative processes in which the pressure differential between reactors is minimized, the pre-reactor vessel may be disposed directly below the hydropyrolysis reactor vessel, or otherwise may form part of the hydropyrolysis reactor vessel (i.e., the solid bed material of the pre-reactor may be disposed in the same physical vessel as the hydropyrolysis reactor), in which case the operating pressures of the pre-reactor and hydropyrolysis reactor will be substantially the same.

Additional hydrogen that is generated from an integrated reforming step may advantageously be used to at least partially satisfy the hydrogen requirements of pretreating (in a pre-reactor vessel) and/or hydropyrolysis (in a hydropyrolysis reactor vessel) as described above. According to particular embodiments, portions, for example a first portion and/or a second portion, respectively, of the reformed hydrogen may be introduced to (i) the hydropyrolysis reactor vessel for hydropyrolyzing the pre-reactor vapor stream or a portion thereof and/or (ii) the pre-reactor vessel. These portions, when introduced to the respective reactor vessels, may be heated to temperatures effective to promote the desired transformations of the biomass-containing feedstock associated with hydropyrolysis and/or pretreating (e.g., devolatilization), as described herein.

In the case of low quality initial feedstocks, such as MSW, containing relatively high amounts (relative to the biomass contained in such feedstocks) of heteroatoms such as halogens (e.g., in the form of chloride-containing compounds such as organic chlorides) as well as nitrogen (e.g., in the form of organic nitrogen-containing compounds) and sulfur (e.g., in the form of organic sulfur-containing compounds), the hydroconversion reactor output and the gaseous mixture that is recovered from the hydroconversion reactor output, as described above, may contain contaminant gases including hydrogenation reaction products of these heteroatoms, including detrimental amounts of HCl, $H_2S$, and $NH_3$, which may be problematic in terms of corrosion and safety concerns. Representative processes may therefore comprise removing at least a portion (e.g., all or substantially all) of one or more of these contaminant gases from the hydroconversion reactor output or the gaseous mixture. Such a removal may be accomplished, for example, by contacting at least a portion of the hydroconversion reactor output and/or the gaseous mixture with a solid sorbent such as $CaCO_3$ or other suitable mineral that has capacity for chloride removal (e.g., in the form of HCl), as described above. According to other embodiments, the contaminant gases may be effectively removed by contacting gas streams, including those described above, which contain acidic and/or basic contaminant gases, with an appropriate liquid scrubbing solution (e.g., a caustic solution, such as an NaOH solution, for the removal of acidic contaminant gases).

Representative Embodiments

According to one representative embodiment, a process for producing liquid products from a biomass-containing feedstock such as MSW or algae may comprise devolatilizing the feedstock in a pre-reactor vessel containing hydrogen and a solid bed material as described above, to produce a pre-reactor vapor stream comprising entrained solid particles. The process may further comprise separating, from the pre-reactor vapor stream, a solids-enriched stream and a purified pre-reactor vapor stream (i.e., a solids-depleted vapor stream, having a lower concentration of solids relative to that of the pre-reactor vapor stream). The purified pre-reactor vapor stream may serve as the pretreated feedstock. In this case, such a pretreated feedstock is the portion of the pre-reactor process vapor stream that is subjected to hydropyrolyzing in a hydropyrolysis reactor vessel. The hydropyrolysis reactor vessel may contain hydrogen and a second catalyst or solid bed material (e.g., a deoxygenating catalyst), such that the hydropyrolyzing step produces a hydropyrolysis reactor output comprising (i) at least one non-condensable gas (e.g., $H_2$, $CO_2$, CO and/or one or more low molecular weight hydrocarbon gas such as $CH_4$, $C_2H_6$, and/or $C_2H_4$), together with any stoichiometric excess of $H_2$ that is not consumed in the hydropyrolysis reactor and remains after any water-gas shift reaction occurring in this reactor (ii) a partially deoxygenated hydropyrolysis product (e.g., in the form of a condensable vapor), and (iii) char particles having an average particle size and/or average particle weight that is less than the average particle size and/or average particle weight, respectively, of char particles entrained in the pre-reactor vapor stream. The process may comprise removing at least a portion, and preferably substantially all, of the char particles from the hydropyrolysis reactor output to provide a purified hydropyrolysis reactor output (i.e., a solids-depleted hydropyrolysis reactor output, having a lower concentration of solids relative to that of the hydropyrolysis reactor output). The process may comprise hydroconverting the partially deoxygenated hydropyrolysis product in a hydroconversion reactor vessel, or otherwise in a hydroconversion zone comprising one or more hydroconversion reactor vessels in series or parallel, using at least one hydroconversion catalyst, as described above. Hydroconversion occurs in the presence of at least a portion of the hydropyrolysis output components (i), (ii), and (iii) above that have not been separated (e.g., to remove entrained char particles), producing a substantially fully deoxygenated hydrocarbon liquid product. Also produced are non-condensable or low molecular weight gases, including $C_1$-$C_3$ hydrocarbons (which may be paraffinic or olefinic), as well as any CO and/or $CO_2$ that remains after any methanation reaction occurring in the hydroconversion reactor vessel or zone, together with any stoichiometric excess of $H_2$ that is not consumed in the hydroconversion reactor vessel or zone and that remains after any water-gas shift reaction occurring in this reactor or zone.

FIG. 1 depicts one possible, non-limiting, system 110 (the boundaries of which are demarcated by a box) for carrying out the steps of pretreatment of a biomass-containing feedstock, followed by hydropyrolysis of a pre-reactor vapor stream that is generated from the pretreatment. According to this particular embodiment, biomass-containing feedstock (e.g., MSW) is introduced to a lower section (e.g., the bottom) of pre-reactor 120 through feedstock inlet 112 after being combined with a pre-reactor gas, introduced to pre-reactor 120 through pre-reactor gas inlet 114. The feedstock and the pre-reactor gas may be introduced to pre-reactor 120 at the same or different locations, for example within particle bed 116. Both the feedstock and the pre-reactor gas may, independently, also be introduced at multiple locations. For example, the pre-reactor gas may be introduced at multiple axial heights of pre-reactor 120 (corresponding to those within and/or outside of, particle bed 116) for the purpose of controlling temperature and/or localized gas velocities, or otherwise improving the uniformity of consumption of reactant gases (e.g., hydrogen). Both feedstock inlet 112 and pre-reactor gas inlet 114 represent inputs to overall system 110.

Pre-reactor gas may contain hydrogen and have a sufficient superficial velocity, within pre-reactor 120, for the fluidization of some or all of the solid particles of a particle bed 116 contained in this reactor. Particle bed 116 generally includes particles of biomass-containing feedstock introduced through feedstock inlet 112, as well as a solid bed material that may be charged to pre-reactor 120 initially and retained in this reactor due to the gas-solid separation occurring at particle bed interface 118, for example if the pre-reactor gas within pre-reactor 120 fluidizes particle bed 116 but has insufficient superficial velocity for the entrainment (elutriation) of the solid bed material. Particle bed interface 118 may therefore represent an upper boundary of an expanded or a quiescent, dense bed phase, or otherwise an upper boundary of a fixed bed. To ensure a complete or substantially complete separation of solid bed material from pre-reactor vapor stream 136 exiting pre-reactor 120, an expanded-diameter gas-solids disengagement zone 124 may be included in an upper section (e.g., freeboard region) of this reactor, above particle bed interface 118. Gas-solids disengagement zone 124 will generally extend to a height above the transport disengagement height (TDH) for particles of solid bed material under the operating conditions employed in pre-reactor 120. Gas-solids disengagement zone 124 can provide a zone of reduced superficial gas velocity, promoting the effective disengagement of relatively small diameter solid particles that would otherwise be elutriated at the higher superficial gas velocity through particle bed 116. Optionally, gas-solid separation may be further improved using mechanical separation devices such as cyclones (not shown) within gas-solids disengagement zone 124.

Both the biomass-containing feedstock and the solid bed material may be introduced to pre-reactor 120 using suitable mechanical equipment for moving solid particles, such as an auger or a screw extruder. A fast moving stream of carrier gas (e.g., an inert gas having a superficial velocity of greater than about 5 m/sec), may be used alone or in combination with the pre-reactor gas, in order to aid the introduction of the biomass-containing feedstock and/or solid bed material into pre-reactor 120.

As described previously, the solid bed material in pre-reactor 120 may act as a catalyst, a sorbent, a heat transfer medium, or provide some combination of these functions. In particular embodiments, this material may be introduced continuously or intermittently to pre-reactor 120 through bed material inlet 132 to compensate for any losses, for example due to attrition. Otherwise, solid bed material may be introduced to compensate for losses accompanying the purposeful removal of solids from particle bed 116. As described above, solids may be removed from one or more solids drawoff outlets 134 corresponding to one or more axial heights within solid particle bed 116, at which solid biomass-containing feedstock (e.g., representing at least a portion of the solid particles in particle bed 116) having either an undesired characteristic, or otherwise an improved characteristic, relative to the initial feedstock (e.g., introduced through feedstock inlet 112), is enriched.

According to one representative embodiment, biomass-containing feedstock is selectively removed from particle bed 116 at an axial height at which particles of feedstock that are relatively inert in the environment of pre-reactor 120 are enriched. For example, particles of feedstock may accumulate in particle bed 116 if their composition does not allow sufficient devolatilization and subsequent elutriation from pre-reactor 120. Such particles may include particles of glass, metal, or plastic that, without the use of a solids drawoff outlet 134, would remain in pre-reactor 120 indefinitely, account for an increasing proportion of particle bed 116, and eventually disrupt the intended operation of pre-reactor 120.

In the case of removal of biomass-containing feedstock enriched in an undesired characteristic, such as a high ash content or a high non-biological material content, the feedstock remaining in pre-reactor 120 necessarily has an improved characteristic, i.e., a reduced ash content, over the initial feedstock. Therefore, this removal results in a pre-treating step as defined herein, which is carried out in situ in pre-reactor 120, whereby the feedstock remaining in particle bed 116 is a pretreated feedstock, in addition to pre-reactor vapor stream 136 exiting pre-reactor 120. According to this embodiment, both a pre-treating step and a devolatilizing step, as defined herein, may be carried out simultaneously in pre-reactor 120. The feedstock removed through a solids drawoff outlet 134, enriched in an undesired characteristic, may be sent for recovery/reclamation of non-biological materials (e.g., plastics) or may otherwise be used in further processing steps (e.g., hydropyrolysis), albeit in a different manner from the manner in which the pretreated feedstock is used. For example, the removed feedstock may be fed to the hydropyrolysis reactor vessel at a different location (e.g., a different axial height), at a different temperature, and/or through different equipment (e.g., a screw extruder), relative to the pretreated feedstock. As another example of both a pre-treating step and a devolatilizing step being carried out simultaneously in pre-reactor 120, the solid bed material may have sorptive capacity for corrosive species such as chloride that might, in the absence of such solid bed material, otherwise exit pre-reactor 120 in pre-reactor vapor stream 136 (e.g., in the form of HCl). In this case, pre-reactor vapor stream 136, including entrained solid particles, is a pretreated feedstock having an improved characteristic, in terms of reduced corrosive species content, over the initial feedstock introduced through feedstock inlet 112.

Any use of the feedstock removed from pre-reactor 120, either having an improved characteristic or otherwise being enriched in an undesired characteristic, and whether or not further processed in an integrated process as described herein, may be preceded by its separation (e.g., by size or density) from some or all of the solid bed material. Any solid bed material separated in this manner may be returned to pre-reactor 120, for example through bed material inlet 132. Therefore, depending on a particular operation, solids withdrawn from particle bed 116 through solids drawoff outlet(s) 134 may represent output(s) from overall system 110 or may otherwise be retained in this system. In particular embodiments, different portions of withdrawn solids (e.g., portions enriched in feedstock and solid bed material, respectively) may be output from, or otherwise retained in, overall system 110.

In the case of removal of feedstock enriched in a desired characteristic (e.g., having one or more of the improved characteristics as described above), such as having a more uniform particle size, this removal results in a pretreating step as defined herein, in which the removed feedstock has an improved characteristic, rendering it more easily upgradable in further processing steps (e.g., hydropyrolysis), for example following its separation (e.g., by size or density) from some or all of the solid bed material. Any solid bed material separated in this manner may be returned to pre-reactor 120, for example through bed material inlet 132.

In view of the foregoing description, fluidization of particle bed 116 may advantageously serve to classify the initial feedstock, introduced through feedstock inlet 112, according to a number of possible characteristics described herein, and particularly those characteristics relating to fluid dynamic properties, namely reduced average particle size, reduced average particle aerodynamic diameter, increased average particle surface area to mass ratio, and a more uniform particle size. According to another representative embodiment, a fraction of the feedstock within pre-reactor 120 may not be fluidized at all, under a given set of conditions. Such a fraction may therefore be removed through a solids drawoff outlet 134 positioned at or near the bottom of particle bed 116, with the removed feedstock having a reduced average particle surface area to mass ratio (e.g., being enriched in glass or dense metallic particles contained in the feedstock), thereby resulting in an in situ pretreating step as defined herein, in which the pretreated feedstock remaining in particle bed 116 has the improved characteristic of an increased average particle surface area to mass ratio. According to further embodiments, the superficial gas velocity in pre-reactor 120 may be varied (e.g., by varying the cross-sectional area within particle bed 116) in order to segregate/concentrate solid particles having certain fluid dynamic properties at differing axial heights within pre-reactor 120.

Depending on the gas introduced through pre-reactor gas inlet 114, the conditions used in pre-reactor 120, and the positioning of solids drawoff outlet(s) 134 a suitable pre-treating step may be performed in pre-reactor 120, optionally in combination with a devolatilizing step. As is apparent from the foregoing description, if both pretreating and devolatilizing steps are carried out, they may be performed on all of the feedstock introduced to pre-reactor 120, or otherwise on different fractions of this feedstock that are either removed from particle bed 116 or retained in this particle bed until sufficiently devolatilized/pyrolyzed and elutriated from pre-reactor 120.

Devolatilization and optional pyrolysis (e.g., hydropyrolysis) of the feedstock, when carried out in pre-reactor 120, require elevated temperatures. In many cases, therefore, it may be desirable for any solid bed material, introduced either continuously (e.g., following regeneration as described in greater detail below) or intermittently through bed material inlet 132, to act as a convenient heat transfer medium that transfers sufficient heat to pre-reactor 120 for devolatilization and optional pyrolysis of the feedstock. This function of transferring heat may be combined with other functions of the solid bed material, described above, including catalytic and/or sorptive functions. Heat may be transferred into pre-reactor using the pre-reactor gas and the biomass-containing feedstock, as an alternative to, or in combination with, the solid bed material. Any of the biomass-containing feedstock, solid bed material, pre-reactor gas, or any combination thereof, may be heated prior to entry to pre-reactor 120.

In addition to functioning as a heat transfer medium, the solid bed material may exhibit catalytic activity, such as hydroconversion (e.g., hydrotreating) catalytic activity as described above, to facilitate at least some conversion of the products of devolatilization and/or pyrolysis to intermediates (which can be further reacted in downstream operations), or even to desired end products. The catalytic activity may facilitate the conversion of gaseous products of devolatilization and/or pyrolysis to a desired composition, for example in terms of amounts of non-condensable gases including $H_2$, $CO_2$, CO, and $CH_4$, as well as the amounts and types of condensable gases such as aromatic, oxygenated hydrocarbons (e.g., phenols and cresols). Representative solid bed materials may have one or more specific catalytic activities that include deoxygenation activity, cracking activity, water-gas shift activity, methanation activity, and combinations thereof. Those skilled in art, consulting the present disclosure, are apprised of suitable, active catalyst metals (e.g., Co, Mo, Ni, V, W, Pd, Pt, Rh) and suitable catalyst support materials (e.g., amorphous or crystalline metal oxides such as silica and alumina, zeolites such as MFI-type zeolites including ZSM-5, and non-zeolitic molecular sieves such as SAPO-type materials) for imparting one or more, desired catalytic activities to the solid bed material, for use in the environment of pre-reactor 120.

According to some embodiments, the catalytic activity of at least some of the solid bed material may desirably be the same type and degree as used in a downstream hydropyrolysis reactor. In other embodiments, the same type of catalytic activity may be desired, but at a different degree (level) of activity. In such embodiments, solid bed materials, in this case catalysts, for the pre-reactor and hydropyrolysis reactor may include the same types of materials, but with different amounts of active, deposited catalyst metals on a support material. Alternatively, a catalyst in fresh condition may be used in the hydropyrolysis reactor, if greater catalytic activity is desired in its operation, whereas the same catalyst in a partially spent (e.g., partially coked) condition may be used in the pre-reactor if reduced catalytic activity is desired in its operation. Conveniently, therefore, catalyst may be continuously or intermittently removed from the hydropyrolysis reactor (e.g., after attaining a specified coke level or reduction in activity) and continuously or intermittently introduced to the pre-reactor. Depending on whether bed material inlet 132 is used for introducing partially spent catalyst from the hydropyrolysis reactor, or whether it is used for introducing solid bed material from an outside source, bed material inlet 132 may or may not represent an input to overall system 110. In an alternative embodiment, if higher catalytic activity is desired in the pre-reactor relative to the hydropyrolysis reactor, fresh catalyst may be used in the former and continuously or intermittently transferred to the latter.

Following disengagement of bed material and un-elutriated char particles in gas-solids disengagement zone 124 of pre-reactor 120, pre-reactor vapor stream 136 may be withdrawn from pre-reactor 120. Pre-reactor vapor stream 136 will generally comprise entrained or elutriated solid particles of char, optionally in combination with particles (e.g., attrited fine particles) of the solid bed material. Fluidization conditions can be controlled within pre-reactor 120 to establish a given char and/or solid bed material cutoff diameter, above which the char and/or solid bed material is returned to, or retained in, particle bed 116 and below which the char and/or solid bed material is removed from pre-reactor 120 in vapor stream 136. In this manner, the residence time of the solid feedstock particles can be controlled, insofar as the feedstock is prohibited from exiting pre-reactor 120 until it is devolatilized/pyrolyzed to a desired extent, corresponding to a cutoff diameter. Due to potentially different densities and surface geometries of the char and solid bed material, the cutoff diameters for the char and solid bed material may be different and selected to accomplish different objectives. As noted above, mechanical equipment such as cyclones may, in combination with the fluidization conditions (e.g., superficial gas velocity) influence the cutoff diameters. Control of char residence time, together with the control of other conditions in pre-reactor 120, including, for example, temperature, total pressure, and/or hydrogen partial pressure, may promote the devolatilization, pyrolysis, and/or hydropyrolysis of biomass-containing feedstock under particle fluidizing conditions in a manner tailored to the initial characteristics of the feedstock and desired characteristics of the pre-reactor vapor and/or any feedstock withdrawn from particle bed 116.

In addition to entrained char particles, pre-reactor vapor stream 136 exiting pre-reactor 120 generally contains the gaseous products formed from devolatilization, and possibly also formed from a desired extent of pyrolysis. Such gaseous products can include CO, $CO_2$, $H_2O$, hydrocarbons, and oxygenated hydrocarbons. Under certain operating conditions of pre-reactor 120, combined with the use of a solid bed material having catalytic methanation activity (and potentially water-gas shift activity), CO and/or $CO_2$ may be substantially or completely converted to $CH_4$, in which case CO and/or $CO_2$ may be substantially or completely absent from pre-reactor vapor stream 136. In a highly methanating environment, it may be possible for pre-reactor vapor stream 136 to comprise less than 5 vol-% or even less than 1 vol-% of combined CO and $CO_2$, based on the amount of all non-condensable gases in this stream.

According to the embodiment of FIG. 1, pre-reactor vapor stream 136 is fed to optional pre-reactor gas-solids separator 138, for the removal of entrained solids such as char and/or fine particles of solid bed material. Entrained solids may be removed using mechanical devices including filters, external cyclones, electrostatic separators, liquid contactors (e.g., bubblers), etc. If pre-reactor gas-solids separator 138 is used, a purified pre-reactor vapor stream 140 is obtained, having a reduced content of solids relative to pre-reactor vapor stream 136. Depending on the particular method for separating the solids, a solids-enriched stream 142 may also be obtained, having an increased content of solids relative to pre-reactor vapor stream 136. For example, external cyclones, electrostatic separators, and other mechanical devices can provide a continuous solids-enriched stream 142 of relatively concentrated solid particles. In general, the solid particles in solids-enriched stream 142 will have a higher average particle size and/or higher average particle weight, compared to any solid particles remaining in purified pre-reactor vapor stream 140. If gas-solids separator 138 is used, a portion of pre-reactor vapor stream 136, namely purified pre-reactor vapor stream 140 may be introduced to hydropyrolysis reactor 150, and solids-enriched stream 142 may represent an output from system 110. If a gas-solids separator is not used, then the entire pre-reactor vapor stream 136, including solids entrained from pre-reactor 120, may be introduced to hydropyrolysis reactor 150.

In addition to all or a portion of pre-reactor vapor stream 136, hydrogen-containing stream 144 may also be introduced to hydropyrolysis reactor 150 and, if used (for example, according to the particular embodiment depicted in FIG. 1), represents an input to overall system 110. Hydrogen-containing stream 144 may be introduced at the bottom of hydropyrolysis reactor 150, as shown in FIG. 1, and may serve to entrain any solid particles present in pre-reactor vapor stream 136 or purified pre-reactor vapor stream 140. Hydrogen-containing stream 144 may be introduced at multiple axial heights of hydropyrolysis reactor 150 (corresponding to those within and/or outside of, deoxygenating catalyst bed 146) for the purpose of controlling temperature and/or localized gas velocities, or otherwise improving the uniformity of consumption hydrogen.

Hydropyrolysis reactor 150 may therefore contain deoxygenating catalyst bed 146, above which is expanded diameter gas-catalyst disengagement zone 148, functioning similarly to gas-solids disengagement zone 124 of pre-reactor 120. In addition, one or more deoxygenating catalyst inlets 152 and one or more deoxygenating catalyst drawoff outlets 154 may provide for continuous or intermittent introduction and/or removal of deoxygenating catalyst to and/or from hydropyrolysis reactor 150. For example, fresh deoxygenating catalyst may be continuously or intermittently introduced through deoxygenating catalyst inlet(s) 152 and spent or partially spent deoxygenating catalyst may be continuously or intermittently removed through deoxygenating catalyst drawoff outlet(s) 154. According to a particular type of operation described above, the removed catalyst may be transferred to bed material inlet 132 of pre-reactor 120 to provide solid bed material in the form of partially spent catalyst. Depending on whether deoxygenating catalyst inlet(s) 152 and deoxygenating catalyst drawoff outlet(s) 154 are used, and whether catalyst removed from hydropyrolysis reactor 150 is used in pre-reactor 120 (or otherwise regenerated or sent for metals reclamation), deoxygenating catalyst inlet(s) 152 may represent input(s) to overall system 110 and deoxygenating catalyst drawoff outlet(s) may represent output(s) from overall system 110.

At least a portion of pre-reactor vapor stream 136 (e.g., purified pre-reactor vapor stream 140) may be subjected to a hydropyrolyzing step in hydropyrolysis reactor 150 in the presence of hydrogen and the deoxygenating catalyst. A hydropyrolysis reactor output 156, containing one or more non-condensable gases, a partially deoxygenated hydropyrolysis product, and char particles produced in hydropyrolysis reactor vessel 150 is removed. As described above with respect to pre-reactor vapor stream 136, non-condensable gases in hydropyrolysis reactor output 156 can include $H_2$, $CO_2$, CO, $CH_4$, and mixtures thereof, with the relative proportions depending on, for example, the methanating activity and water-gas shift activity of the deoxygenating catalyst. In the case of a deoxygenating catalyst with substantial methanation activity, $CO_2$ and/or CO may be substantially absent from hydropyrolysis reactor output 156. For example, it may be possible for hydropyrolysis reactor output 156 to comprise less than 5 vol-% or even less than 1 vol-% of combined CO and $CO_2$, based on the amount of all non-condensable gases present.

According to the embodiment shown in FIG. 1, substantially all char particles in hydropyrolysis reactor output 156 are removed in hydropyrolysis reactor gas-solids separator 158. Entrained char particles may be removed using mechanical devices including filters, external cyclones, electrostatic separators, liquid contactors (e.g., bubblers), etc. to provide purified hydropyrolysis vapor stream 160 having a reduced char content and optionally a char-enriched stream 162, for example in the case of external cyclones, electrostatic separators, and other mechanical devices that provide an effluent stream of relatively concentrated char particles.

Both purified hydropyrolysis vapor stream 160 and optional char-enriched stream 162 represent outputs from system 110.

Figure 2:
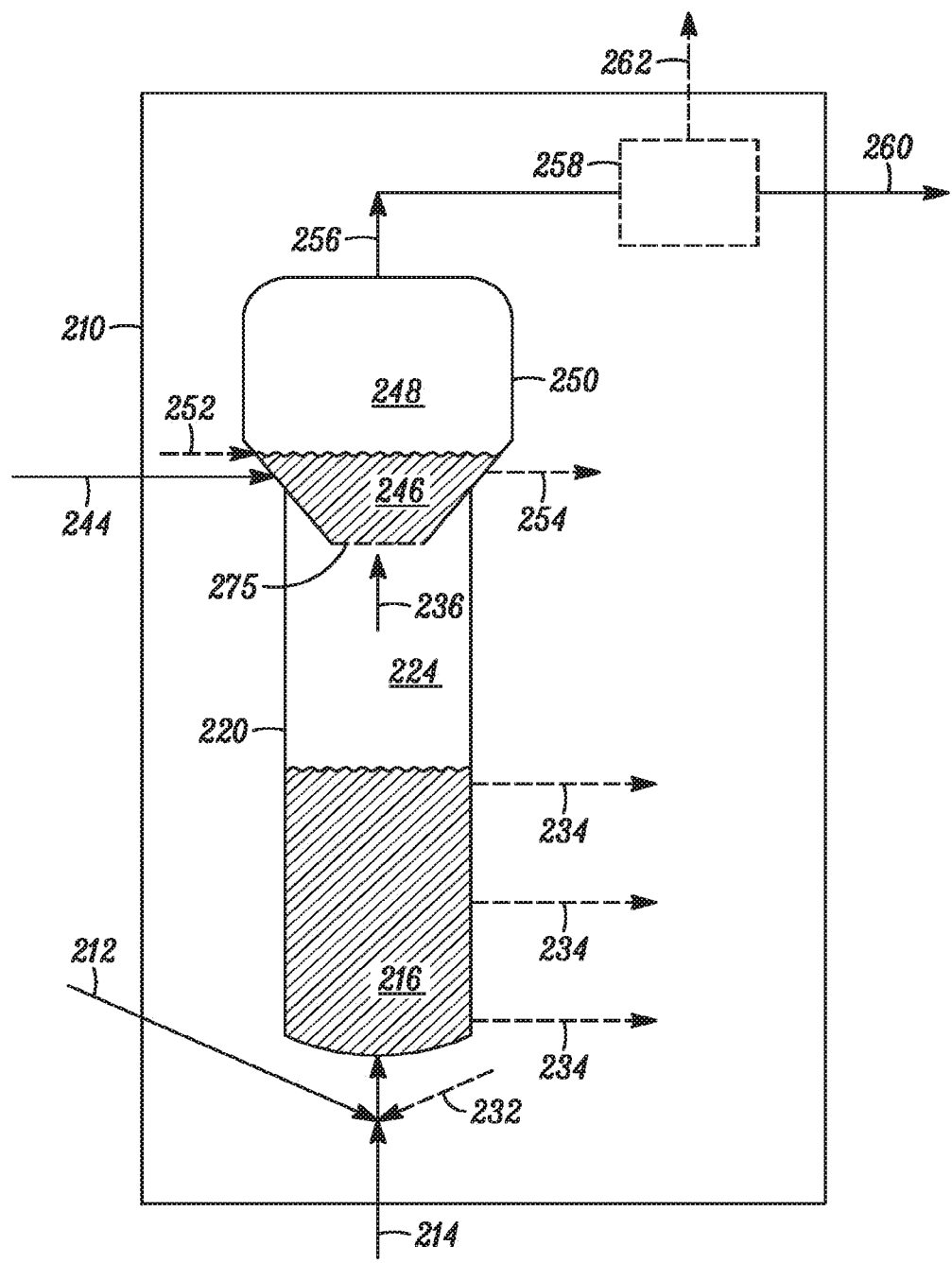
FIG. 2 is a schematic flow diagram of an alternative system of a pre-reactor and a hydropyrolysis reactor, according to another embodiment of this disclosure.

FIG. 2 depicts a non-limiting alternative system 210 (the boundaries of which are demarcated by a box) in which pre-reactor 220 and hydropyrolysis reactor 250 are in a stacked relationship. This configuration may be advantageous in certain cases, for example if operating conditions (e.g., temperatures and/or pressures) in these reactors 220, 250 are the same or similar. Otherwise, this configuration may be employed in embodiments in which there is no external separation of solid particles (for example using pre-reactor gas-solids separator shown in FIG. 1) entrained in pre-reactor vapor 236, entering hydropyrolysis reactor 250. Using this configuration, part or all of the gas requirements, including the hydrogen requirements, for both hydropyrolysis reactor 250 and optionally pre-reactor 220, may be provided through pre-reactor gas inlet 214. However, part or all of these gas requirements may alternatively be provided through a combination of pre-reactor gas inlet 214 and hydrogen containing stream 244, optionally in combination with other gas inlets (not shown).

The separation of deoxygenating catalyst bed 246 in hydropyrolysis reactor 250 from particle bed 216 in pre-reactor 220 may be aided to some extent by upwardly flowing pre-reactor vapor 236, and in this regard the superficial velocity of this vapor may be increased as it enters hydropyrolysis reactor 250, for example by passing this vapor through constricted opening 275 at the base of hydropyrolysis reactor 250. Constricted opening 275 will generally have a cross-sectional area that is less than the cross-sectional area of pre-reactor 220, or at least less than the cross-sectional area of gas-solids disengagement zone 224 of pre-reactor 220. Constricted opening 275 may be covered by one or more mechanical separation elements, such as a screen, mesh, inert material, etc. to maintain deoxygenating catalyst bed 246 within hydropyrolysis reactor 250. For example, constricted opening 275 may be covered by a screen having openings of a suitable size or diameter, which allow elutriated solid particles in pre-reactor vapor 236 to pass into hydropyrolysis reactor 250, but do not allow deoxygenating catalyst to pass into pre-reactor 220.

As is apparent from the foregoing description of the embodiment depicted in FIG. 2, pre-reactor 220 and hydropyrolysis reactor 250 may together comprise a single vessel. As in the embodiment depicted in FIG. 1, pre-reactor 220 and hydropyrolysis reactor 250 can include, respectively, gas-solids disengagement zone 224 and gas-catalyst disengagement zone 248, extending to sufficient heights above particle bed 216 and deoxygenating catalyst bed 248, respectively, for effective disengagement of solid bed material from the pre-reactor vapor 236 and deoxygenating catalyst from hydropyrolysis reactor output 256. The efficiency or degree of this disengagement may be improved using mechanical separation devices such as cyclones (not shown) within gas-solids disengagement zone 224 and/or gas-catalyst disengagement zone 248. The effective disengagement occurring within disengagement zones 224, 248, whether or not mechanical separation devices are used, does not preclude the existence of minor amounts of solid bed material in pre-reactor vapor 236 and/or minor amounts of deoxygenating catalyst in hydropyrolysis reactor output 256, with these minor amounts comprising fine solid particles resulting from, for example, mechanical breakage due to attrition. Such fine solid particles, as well as entrained char particles, may be removed in further separation steps, for example using hydropyrolysis reactor gas-solids separator 258 to yield purified hydropyrolysis vapor stream 260 and optionally char-enriched stream 262, both of which represent outputs from system 210. Gas-solids separator 258 can include any device as described with respect to the embodiment depicted in FIG. 1 for the removal of entrained char particles exiting the hydropyrolysis reactor.

Other features described with respect to the embodiment depicted in FIG. 1 function in the same or in an analogous manner in the embodiment depicted in FIG. 2. These features include those representing inputs to system 210, such as feedstock inlet 212, pre-reactor gas inlet 214, hydrogen-containing stream 244, bed material inlet 232 and deoxygenating catalyst inlet 252. These features also include those representing possible outputs from system 210, such as solids drawoff outlet(s) 234, char-enriched stream 262, and deoxygenating catalyst drawoff outlet 254. The introduction of solids (e.g., feedstock, solid bed material, and/or catalyst) to the pre-reactor 120, 220 or hydropyrolysis reactor 150, 250 may be accomplished using suitable mechanical equipment for moving solid particles, such as an auger or a screw extruder. A fast moving stream of carrier gas (e.g., an inert gas having a superficial velocity of greater than about 5 m/sec), may be used alone or in combination with process gas streams described herein, in order to aid the introduction of the solids.

Likewise, the withdrawal of solids (e.g., feedstock enriched in ash content or having some other undesirable characteristic) from the pre-reactor 120, 220 or hydropyrolysis reactor 150, 250 may be accomplished using similar equipment, such as a solids-removal screw, or otherwise using an overflow pipe, sequentially cycled lock hoppers, or other known equipment. According to one particular embodiment, solids withdrawn from solids drawoff outlet(s) 134, 234 of pre-reactor 120, 220 may include solid bed material having catalytic hydrotreating activity, as described above. This activity decreases over time as impurities such as carbon (coke), melted plastic, and other reaction products or feedstock impurities deposit on the solid bed material. Solid bed material that is a hydrotreating catalyst, following removal from solids drawoff outlet(s) 134, 234, may therefore be subjected to a suitable regeneration, by combusting the accumulated coke and other impurities with oxygen to yield a regenerated solid bed material that may be returned to pre-reactor 120, 220 (e.g., through bed material inlet 132) or even introduced to hydropyrolysis reactor 150, 250 (e.g., through deoxygenating catalyst inlet 152, 252. Prior to any such regeneration and re-use of the regenerated catalyst, it may be desirable to separate the removed solid bed material (e.g., spent hydrotreating catalyst) from other solids (e.g., char particles generated from the feedstock and/or inert materials contained in the feedstock) contained in particle bed 116, 216 at the location (e.g., axial height of pre-reactor 120, 220) at which the solid bed material is removed. In a similar manner, deoxygenating catalyst withdrawn from deoxygenating catalyst bed 146, 246 of hydropyrolysis reactor 150, 250, may also be regenerated, optionally following a separation from other solids (e.g., char particles) contained in deoxygenating catalyst bed 146, 246 at the location (e.g., axial height of hydropyrolysis reactor 150, 250) at which the deoxygenating catalyst is removed.

Advantageously, the fluidized bed regeneration of withdrawn solid bed material from pre-reactor 120, 220 or withdrawn deoxygenating catalyst from hydropyrolysis reactor 150, 250, to at least partially restore hydrotreating activity, can simultaneously act to classify various solids, in a similar manner as described above with respect to the operation of pre-reactor 120, 220. That is, solids having distinct fluid dynamic properties can, under appropriate conditions of fluidization (e.g., superficial gas velocity), segregate/concentrate at differing axial heights within a fluidized bed regeneration vessel, where they may be withdrawn to achieve a desired separation. For example, in the case of solid bed material withdrawn from pre-reactor 120, 220, particles having a relatively low surface area to mass ratio (e.g., metals, glass, and/or other inert materials), which are more difficult to fluidize (or may not be fluidized at all) may tend to concentrate near (or at) the bottom of a fluidized bed. According to other exemplary separations based on fluid dynamic properties, ash (in the form of decarbonized char) may be withdrawn from an upper section or the top of a fluidized bed regeneration vessel (e.g., as particles elutriated in the exiting gas stream, such as a combustion (flue) gas effluent). Regenerated catalyst, having a reduced coke content, may be withdrawn from a central section of a fluidized bed regenerator vessel (e.g., from within the fluidized particle bed) and returned to pre-reactor 120, 220 and/or utilized in hydropyrolysis reactor 150, 250. According to other embodiments, the superficial gas velocity in a fluidized bed regenerator vessel may be varied (e.g., by varying the cross-sectional area within the fluidized bed) in order to segregate/concentrate solid particles having certain fluid dynamic properties at differing axial heights within the regenerator vessel.

Some hydrotreating catalysts, and particularly those having Co, Ni, and/or Mo as catalytic metals (e.g., CoMo and NiMo catalysts) require these metals to exist in their sulfided (or oxidized) state in order to remain catalytically active. Specifically, if sulfided catalysts are not exposed to sufficient sulfur (e.g., as $H_2S$) during their normal use, they may become deactivated over time due to a loss of sulfided metal sites. Consequently, solid bed material withdrawn from pre-reactor 120, 220 or deoxygenating catalyst withdrawn from hydropyrolysis reactor 150, 250 may be subjected to fluidized bed sulfiding, with the same advantages, in terms of classifying solid particles with differing fluid dynamic properties, as described above with respect to fluidized bed regeneration. Therefore, the exemplary separations described above, based on differing fluid dynamic properties of particles, are applicable to both fluidized bed sulfiding and fluidized bed regeneration. Accordingly, in the case of separating elutriated, fine solids in gaseous effluent streams, these solids may be removed in either a combustion (flue) gas effluent of a regeneration vessel or a hydrogen-containing sulfiding effluent of a sulfiding vessel.

Unlike catalyst regeneration that involves the combustion of deposited coke in an oxidizing environment, suitable catalyst sulfiding is performed under reducing conditions. A preferred fluidizing gas for sulfiding solid bed material or deoxygenating catalyst is a predominantly hydrogen-containing gas having a minor amount of hydrogen sulfide ($H_2S$) or precursor compound that forms $H_2S$ under sulfiding conditions. For example, the fluidizing gas may comprise at least 50 mole-% $H_2$ (e.g., from about 50 mole-% to about 99 mole-%) and less than about 3 mole-% $H_2S$ (e.g., from about 250 mole-ppm to about 3 mole-%, and more typically from about 1000 mole-ppm to about 1 mole-%). The use of such a hydrogen-containing fluidizing gas at elevated temperature can, in addition to sulfiding withdrawn catalyst, also promote hydrogasification of coke deposited on the catalyst, as well as hydrogasification of any char that may be carried into a fluidized bed sulfiding vessel. Hydrogasification can advantageously remove coke deposits from solid bed material or deoxygenating catalyst, which can help restore catalytic activity or other functions (e.g., adsorptive capacity). In addition, hydrogasification of coke and char can be used to form methane and other light hydrocarbons in the gaseous effluent from a fluidized bed sulfiding vessel. In a particular embodiment, a suitable methanation catalyst (e.g., a supported nickel catalyst) may be used to facilitate the production of methane under hydrogasification conditions, or otherwise in a separate reaction step performed (e.g., in a methanation reactor) on the gaseous effluent from the fluidized bed sulfiding vessel.

Figure 3:
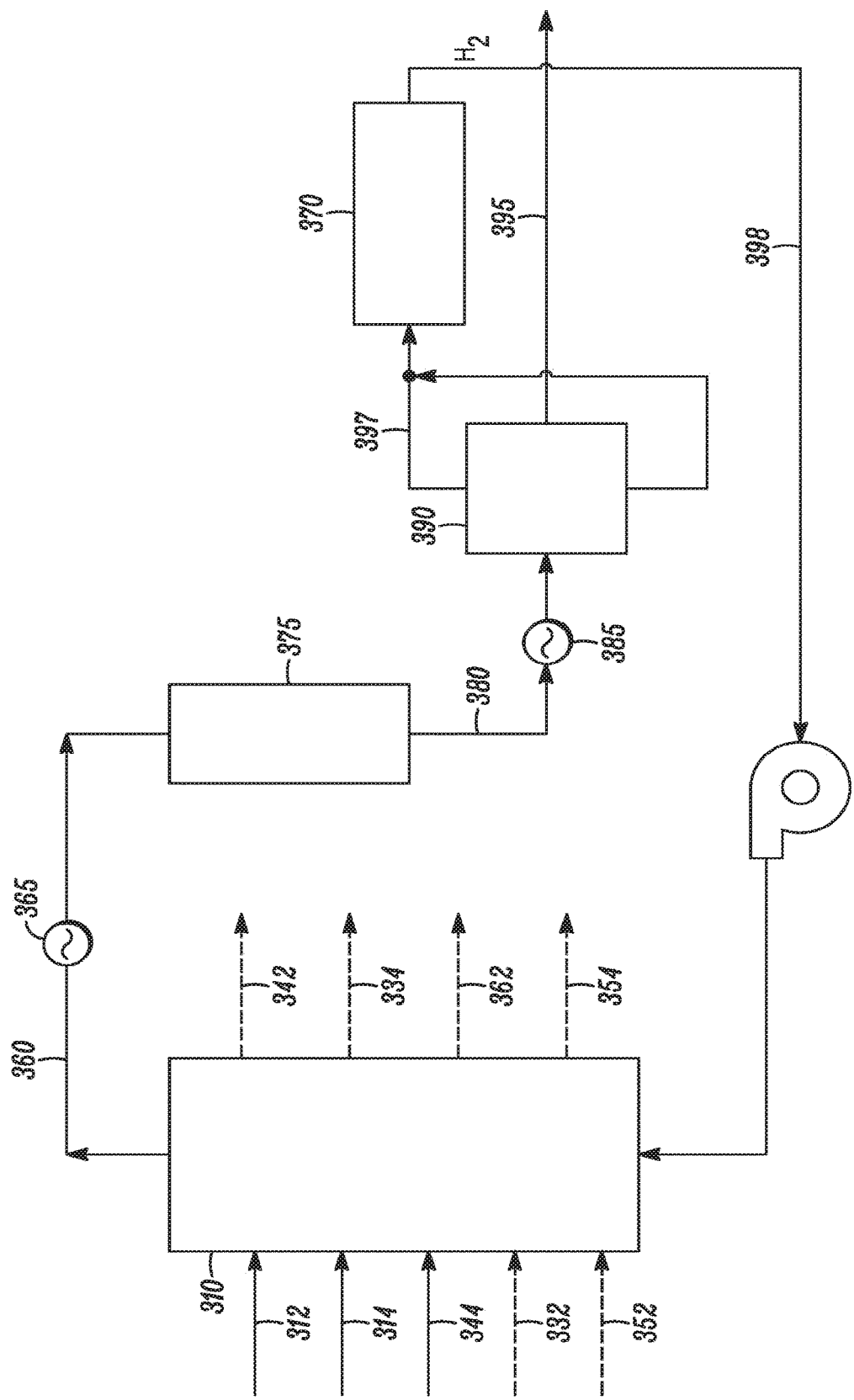
FIG. 3 is a schematic flow diagram of a system of a pre-reactor and a hydropyrolysis reactor, such as the representative systems depicted in FIG. 1 and FIG. 2, which is integrated into a process including a hydroconversion reactor.

FIG. 3 depicts an embodiment of an integrated hydropyrolysis process incorporating system 310, as described above with respect to system 110 in the embodiment of FIG. 1 or system 210 in the embodiment of FIG. 2. Accordingly, inputs to system 310 include feedstock inlet 312 for the introduction of biomass-containing feedstock (e.g., MSW), as well as pre-reactor gas inlet 314 and hydrogen containing stream 344 (if used) for the introduction of gaseous feeds to the pre-reactor and the hydropyrolysis reactor, respectively. Optional inputs include bed material inlet 332 and deoxygenating catalyst inlet 352. Optional outputs from system 310 include solids-enriched stream 342 (e.g., in the case of system 110 of FIG. 1), as well as solids drawoff outlet(s) 334, char-enriched stream 362, and deoxygenating catalyst drawoff outlet 354.

As shown in FIG. 3, purified hydropyrolysis vapor stream 360, following the removal of substantially all char particles from the hydropyrolysis reactor output, is an output from system 310 that is sent for further processing. As described above, purified hydropyrolysis vapor stream 360 generally comprises at least one non-condensable gas (e.g., $H_2$, CO, $CO_2$, and/or $CH_4$), water vapor, and other condensable vapors comprising a partially deoxygenated hydropyrolysis product. The temperature of purified hydropyrolysis vapor stream 360 may be adjusted (heated or cooled) as needed, for example using hydroconversion zone inlet heat exchanger 365, to obtain desired conditions in hydroconversion zone 375. Hydroconversion zone inlet heat exchanger 365 may utilize an external heat exchange medium (e.g., cooling water or high pressure steam), an exchange medium internal to the integrated process (e.g., a feed stream), or a combination thereof. Hydroconversion zone 375 may comprise one or more hydroconversion reactor vessels. According to one embodiment, a single hydroconversion reactor vessel is used in hydroconversion zone 375. The reactor vessel may contain a single type of hydroconversion catalyst for converting, by further deoxygenation, the partially deoxygenated hydropyrolysis product to a substantially fully deoxygenated hydrocarbon product, which may ultimately be condensed to provide a substantially fully deoxygenated hydrocarbon liquid having properties as described above.

Catalysts suitable for use in hydroconversion zone 375 include those having hydrotreating activity, as described above, to promote the desired hydrodeoxygenation, decarbonylation, and decarboxylation reactions, the proportions of which may be controlled according to the particular operating conditions (e.g., pressure or hydrogen partial pressure) used in hydroconversion zone 375, including the one or more hydroconversion reactor vessels. Such catalysts may also be used to promote hydrodentrification, hydrodesulfurization, and/or hydrodechlorination, as necessary to remove heteroatoms from the partially deoxygentated hydropyrolysis product, in the form of the gases $NH_3$, $H_2S$, and/or HCl, which may be removed from the fully deoxygenated hydrocarbon liquid by downstream phase separation of a gaseous mixture therefrom. The need for the removal of heteroatoms is largely dependent on the properties of the particular biomass-containing feedstock being processed, including the contents of these heteroatoms.

According to some embodiments, a single hydroconversion reactor vessel is used in hydroconversion zone 375, having catalysts with hydrotreating activity and optionally other hydroprocessing activities as described above (e.g., hydrocracking and/or hydroisomerization activities). The differing activities can be provided with a single catalyst (e.g., a catalyst having hydrotreating activity in addition to hydrocracking activity by virtue of the introduction of acid sites on the support material). Otherwise, the differing activities can be provided with multiple catalysts, having differing hydroprocessing activities as described above, positioned in discreet catalyst beds within the hydroconversion reactor vessel (e.g., an upstream bed of catalyst having primarily hydrotreating activity, for carrying out a desired degree of deoxygenation and a downstream bed of catalyst having primarily hydrocracking activity, for reducing the molecular weight of the substantially fully deoxygenated hydrocarbon liquid). Otherwise, the differing activities can be provided with multiple catalysts being dispersed uniformly throughout a single catalyst bed, using a desired mixing ratio of the multiple catalysts.

According to yet further embodiments, hydroconversion zone 375 may comprise two or more hydroconversion reactor vessels, for example positioned in parallel or in series, and containing catalysts having differing hydroprocessing activities and operating under different conditions (e.g., differing pressures and/or temperatures). In a particular embodiment, a first hydroconversion reactor vessel containing a catalyst having hydrotreating activity may be positioned in series with, and upstream of, a second hydroconversion reactor containing a catalyst having hydrocracking activity. Otherwise, these first and second hydroconversion reactors may be positioned in parallel. As will be appreciated by those having skill in the art, and benefiting from the knowledge gained from the present disclosure, the use of differing hydroprocessing catalysts in one or more hydroconversion reactor vessels, arranged in various configurations, can be tailored to achieve desired characteristics of the substantially fully deoxygenated hydrocarbon liquid, based on the properties of the particular biomass-containing feedstock being processed.

A hydroconversion zone output 380 (e.g., the effluent or output from a hydroconversion reactor), containing a gaseous mixture including hydrogen and other non-condensable gases (e.g., CO, $CO_2$, and/or $CH_4$) may be cooled using hydroconversion zone outlet heat exchanger 385, which may utilize an external heat exchange medium (e.g., cooling water), an exchange medium internal to the integrated process (e.g., a feed stream), or a combination thereof. Cooling of hydroconversion zone output 380 (e.g., the output from a single hydroconversion reactor, or otherwise two or more of such reactors, as described above) allows for phase separation of the components of this stream in separation zone 390. Separation zone 390 may comprise one or more stages of phase separation, which may be achieved, for example, using one or more flash separators operating in series, or otherwise using a packed column, and optionally a stripping medium (e.g., a flowing stripping gas), to achieve multiple theoretical equilibrium liquid-vapor separation stages. Due to the significant differences in relative volatility between components of the gaseous mixture and components of the substantially fully deoxygenated hydrocarbon liquid, separation using a single flash separator or two flash separators may be sufficient.

From separation zone 390, substantially fully deoxygenated hydrocarbon liquid 395 is recovered as a condensed fraction or liquid phase, and gaseous mixture 397 is removed as a non-condensed fraction or vapor phase. At least a portion of separated gaseous mixture 397 is introduced to steam reformer 370, which provides a net production of hydrogen that may be recycled to system 310, via hydrogen recycle stream 398, to satisfy some or all of the hydrogen requirements of this system. Steam reformer 370 also generates a net amount of $CO_2$. The output from steam reformer 370, or a portion thereof, may be enriched in hydrogen (e.g., by selective removal of $CO_2$ and/or other gases) using additional separation equipment (not shown), for example a membrane separation unit or a pressure swing adsorption (PSA) unit, to provide a high purity hydrogen-containing gas stream for recycle to system 310. In addition, substantially fully deoxygenated hydrocarbon liquid 395 may be fractionated, as described above, using further separation equipment (not shown), for example a distillation column or series of distillation columns, to obtain substantially fully deoxygenated higher value liquid products such as gasoline boiling-range and/or diesel fuel boiling-range hydrocarbon fractions.

EXAMPLES

The following examples are set forth as representative of the present invention. These examples are not to be construed as limiting the scope of the invention as these and other equivalent embodiments will be apparent in view of the present disclosure and appended claims.

Example 1—Preparation and Composition of MSW Feedstock

About 500 grams of 3.2 mm average diameter MSW pellets, obtained from a commercial supplier of materials derived from recycled MSW, were reduced in size to particles having diameters ranging from approximately 0.85 mm to 3.35 mm, based on screening. The plastic content of the MSW was about 5 wt-%, which is less than most typical MSW types that are sent to landfills. The MSW also contained other types of non-biological materials (e.g., glass and metals) that are normally contained in these solid wastes. The moisture and ash content of the MSW, as well as some elemental analyses, are provided below in Table 1, as measuring using standard (ASTM) test methods.

TABLE 1

| MSW Feedstock, Selected Component Analysis | | |
|---|---|---|
| | As Received | Moisture Free Basis |
| Moisture, % | 2.91 | — |
| Ash (750° C.), % | 10.59 | 10.91 |
| Carbon, % | | 44.94 |
| Hydrogen, % | | 6.27 |
| Nitrogen, % | | 0.72 |
| Sulfur, % | | 0.20 |
| Oxygen, % | | 36.96 |

The ash content of 10.91 wt-% (moisture free basis), shown in Table 1, was considerably higher than the corresponding value of 0.21 wt-% for wood alone (see Table 2 below). Moreover, the MSW was found to contain about 0.5 wt-% (about 5,000 wt-ppm) of elemental chloride, which is also well above the amount present in wood, typically in the range of about 100-200 wt-ppm. The substantial addition of chloride originating from the MSW poses significant processing obstacles, in terms of the increasing the potential for corrosion and/or the emission of hazardous gases. For comparison, the moisture and ash content of a wood feedstock used in biomass pyrolysis, as well as the same elemental analyses as provided in Table 1 with respect to MSW, are provided below in Table 2.

TABLE 2

Wood Feedstock, Selected Component Analysis

|  | As Received | Moisture Free Basis |
|---|---|---|
| Moisture, % | 4.11 | — |
| Ash (750° C.), % | 0.20 | 0.21 |
| Carbon, % |  | 50.13 |
| Hydrogen, % |  | 5.83 |
| Nitrogen, % |  | 0.05 |
| Sulfur, % |  | 0.02 |
| Oxygen, % |  | 43.76 |

At least some of the differences in the amounts of elemental carbon (C), hydrogen (H), and oxygen (O) in MSW compared to wood are attributable primary to the presence of plastic. This non-biological material also affects the molar ratios of these elements, as shown below in Table 3, which in turn impacts the hydropyrolysis reaction chemistry. In addition, plastic normally melts under conditions suitable for the hydropyrolysis and hydroconversion of biomass, which can cause coating/agglomeration of solid particles (char, catalyst, solid bed material, and the MSW itself) present in the processing steps. This adversely affects fluidized bed operation, as the free movement of the particles is hindered.

TABLE 3

Comparison of Elemental Ratios, Wood vs. MSW

|  | Wood | MSW |
|---|---|---|
| C/H Molar Ratio | 0.72 | 0.60 |
| C/O Molar Ratio | 1.53 | 1.62 |

Example 2—Conversion of MSW Feedstock Via Hydropyrolysis and Hydroconversion

The MSW feedstock, having the particle size and composition as described in Example 1, was tested in a pilot-scale hydropyrolysis processing unit, in terms of its ability to be converted to hydrocarbons in the gasoline and/or diesel fuel boiling-range. The MSW particles were transported via a screw conveyor from a feed hopper to the bottom of a fluidized bed, hydropyrolysis reactor vessel having dimensions of approximately 3.3 cm i.d.×76 cm height. Pre-heated hydrogen was also introduced to the bottom of this reactor and served as the fluidizing gas for both the transported MSW particles and about 200 grams of conventional cobalt/molybdenum (Co/Mo) hydrotreating catalyst, which was pre-loaded in the reactor vessel. The reactor was maintained under temperature and pressure conditions of approximately 457° C. and 19 barg. The vapor residence was approximately 1-2 seconds. The char resulting from the hydropyrolysis of the MSW remained largely within the reactor vessel, although this material could also have been elutriated under conditions of higher fluidization velocity.

Vapors generated in the hydropyrolysis reactor were filtered to capture any fine solid particles in this gas stream, prior to the cooling and introduction of these vapors to a second-stage reactor hydroconversion reactor containing about 780 grams of a conventional nickel-molybdenum (NiMo) hydrotreating catalyst in a fixed bed. The pressure of the second stage reactor was maintained substantially the same as that of the hydropyrolysis reactor, but the operating temperature was reduced to about 371° C. The second stage reactor served to further deoxygenate the biomass-derived, condensable vapors produced from hydropyrolysis. The vapors exiting the hydroconversion reactor therefore included hydrocarbons suitable for use in transportation fuels. These vapors were then cooled to condense a high value liquid product and separate gaseous products, including CO and $CO_2$. Using knockout pots in series, the hydrocarbons of the liquid product were separated into fractions containing lower molecular weight, gasoline boiling-range material and higher molecular weight, diesel fuel boiling-range material. Product yields from this test, using MSW as a feedstock, were calculated based on the measured quantities of products, as well as the analysis of the gaseous product composition. These yields were compared with those obtained from a test run under similar conditions but using a pure biomass feedstock (wood). The comparative yield data, based on feedstock weight, are provided below in Table 4.

TABLE 4

Comparative Yield Data (%), MSW vs. Wood (moisture, ash-free basis)

|  | Wood | MSW |
|---|---|---|
| Char | 9% | 9% |
| $C_4^+$ vapors and liquid hydrocarbons | 30% | 29% |
| Water | 38% | 37% |
| $C_1$-$C_3$ vapors | 18% | 15% |
| CO and $CO_2$ | 13% | 12% |

On a moisture and ash-free (MAF) basis, yield profiles are nearly the same for wood and MSW feedstocks. Surprisingly, therefore, the high plastics content, chlorine content, and ash content of the MSW did not appear to significantly impact the hydropyrolysis/hydroconversion process chemistry. These results indicate that, under suitable processing conditions, it is possible to convert feedstocks that are mixed (i.e., contain both biomass and non-biomass), contaminated, or otherwise problematic (e.g., containing significant amounts of glass, catalyst poisons, and/or metals), such as MSW, into $C_4^+$ liquid hydrocarbons, including gasoline and diesel fuel fractions, at economically favorable yields. The marginal reduction in $C_1$-$C_3$ vapor yields, for the MSW feedstock compared to wood, may indicate that heavier hydrocarbons are produced preferentially by conversion of plastics, rather than light, non-condensable gases.

Based on these results, the use of suitable pretreating steps described herein can be effective to upgrade other types of initial feedstocks, including MSW containing higher levels of plastics, inert materials, and catalyst poisons. This is despite the failure of conventional processes to achieve satisfactory results and also despite the failure of the biomass pyrolysis and hydropyrolysis arts to even generally recognize or contemplate the use of pretreating steps, including those described herein, to upgrade very low value materials (e.g., MSW or algae) and render them useful for processing in an integrated process comprising the further steps of hydropyrolysis and hydroconversion.

Overall, aspects of the invention are associated with methods for the pretreatment of biomass-containing feedstocks, which methods may generally include steps carried out prior to a hydropyrolysis step and optionally further steps, in order to change one or more characteristics of the feedstock, rendering it more easily upgradable. Those having skill in the art, with the knowledge gained from the present disclosure, will recognize that various changes could be made in these methods, without departing from the scope of the present invention. Mechanisms used to explain theoretical or observed phenomena or results, shall be interpreted as illustrative only and not limiting in any way the scope of the appended claims. Although in the foregoing specification this disclosure has been described in relation to certain preferred embodiments thereof, and details have been set forth for purpose of illustration, it will be apparent to those skilled in the art that the disclosure is susceptible to additional embodiments and that certain of the details described herein can be varied considerably without departing from the basic principles of the disclosure. It should be understood that the features of the disclosure are susceptible to modification, alteration, changes or substitution without departing significantly from the spirit of the disclosure. For example, the dimensions, number, size and shape of the various components may be altered to fit specific applications. Accordingly, the specific embodiments illustrated and described herein are for illustrative purposes only, and not limiting of the invention as set forth in the appended claims.

We claim:

1. A process for producing a higher value liquid product from an initial feedstock comprising the steps of:
   a) removing a least a portion of plastic in the initial feedstock to provide a municipal solid waste (MSW) feedstock having a reduced plastic content relative to the initial feedstock; and
   b) hydropyrolyzing the MSW feedstock in a hydropyrolysis reactor vessel containing hydrogen and a deoxygenating catalyst, producing a hydropyrolysis reactor output comprising at least one non-condensable gas, a partially deoxygenated hydropyrolysis product, and char particles,
      wherein the MSW feedstock comprises one or more of (i) from about 5% to about 25% by weight polyethylene terephthalate, (ii) from about 5% to about 30% by weight high density polyethylene (iii) from about 1% to about 10% by weight polyvinyl chloride, (iv) from about 10% to about 35% by weight low density polyethylene, (v) from about 12% to about 40% by weight polypropylene, or (vi) from about 3% to about 15% by weight polystyrene.

2. The process of claim 1, further comprising:
   c) removing substantially all of the char particles from the hydropyrolysis reactor output to provide a purified hydropyrolysis reactor vapor stream having a reduced char content;
   d) hydroconverting the purified hydropyrolysis reactor vapor stream in a hydroconversion reactor vessel in the presence of a hydroconversion catalyst, producing a hydroconversion reactor output; and
   e) recovering a substantially fully deoxygenated hydrocarbon liquid and a gaseous mixture from the hydroconversion reactor output,
      wherein the hydroconversion reactor output of step d) and the gaseous mixture of step e) include one or more contaminant gases generated from the hydrogenation of heteroatom-containing compounds in the MSW feedstock, the one or more contaminant gases selected from the group consisting of HCl, $H_2S$, and $NH_3$, the process further comprising:
   f) removing at least a portion of the one or more contaminant gases from the hydroconversion reactor output of step d) or the gaseous mixture of step e).

3. The process of claim 2, wherein the one or more contaminant gases includes HCl and step f) comprises contacting at least a portion of the reactor output of step d) or the gaseous mixture of step e) with a solid sorbent that adsorbs HCl.

4. The process of claim 1, wherein the hydropyrolyzing step b) is operated with continuous, intermittent, or localized high agitation conditions that reduce the formation of agglomerates of particles of the deoxygenating catalyst.

5. The process of claim 4, wherein the high agitation conditions include the continuous, intermittent, or localized use of a gas velocity that, in combination with the average particle size and particle size distribution of particles of the deoxygenating catalyst and agglomerates thereof in the hydropyrolysis reactor vessel, breaks formed agglomerates of particles of the deoxygenating catalyst.

6. The process of claim 5, wherein the high agitation conditions include intermittent and localized use of a gas velocity that exceeds the overall superficial velocity of fluidizing gas in the hydropyrolysis reactor vessel.

7. The process of claim 1, wherein said removing step (a) comprises providing, as at least a first fraction, the MSW feedstock, and further providing a second fraction having a content of plastic that is higher, compared to the content of plastic of the MSW feedstock.

8. The process of claim 7, further comprising separately feeding the first and second fractions to the hydropyrolysis reactor vessel at separate locations.

9. The process of claim 8, wherein the first fraction is fed to the hydropyrolysis reactor vessel through a cooled screw assembly, and wherein the second fraction is fed to the hydropyrolysis reactor vessel through a heated extruder.

10. The process of claim 1, wherein the higher value liquid product comprises gasoline or diesel fuel boiling-range hydrocarbons.

11. A process for producing a higher value liquid product from an initial municipal solid waste (MSW) feedstock, comprising hydropyrolyzing a pretreated MSW feedstock in a hydropyrolysis reactor vessel containing hydrogen and a deoxygenating catalyst, producing a hydropyrolysis reactor output comprising at least one non-condensable gas, a partially deoxygenated hydropyrolysis product, and char particles,
   wherein the pretreated MSW feedstock is obtained by removing at least a portion of plastic in the initial MSW feedstock to provide the pretreated MSW feedstock having a reduced plastic content relative to the initial MSW feedstock,
   wherein the pretreated MSW feedstock comprises heteroatom-containing compounds including chloride-containing compounds, sulfur-containing compounds, and nitrogen-containing compounds, and
   wherein the hydropyrolysis reactor output further comprises one or more contaminant gases generated from the hydrogenation of the heteroatom-containing compounds in the pretreated MSW feedstock, the one or more contaminant gases selected from the group consisting of HCl, H2S, and NH3.

12. The process of claim 11, wherein the pretreated MSW feedstock comprises one or more of (i) from about 5% to about 25% by weight polyethylene terephthalate, (ii) from about 5% to about 30% by weight high density polyethylene (iii) from about 1% to about 10% by weight polyvinyl chloride, (iv) from about 10% to about 35% by weight low density polyethylene, (v) from about 12% to about 40% by weight polypropylene, or (vi) from about 3% to about 15% by weight polystyrene.

13. The process of claim 11, further comprising:
removing substantially all of the char particles from the hydropyrolysis reactor output to provide a purified hydropyrolysis reactor vapor stream having a reduced char content;
hydroconverting the purified hydropyrolysis reactor vapor stream in a hydroconversion reactor vessel in the presence of a hydroconversion catalyst, producing a hydroconversion reactor output; and
recovering a substantially fully deoxygenated hydrocarbon liquid and a gaseous mixture from the hydroconversion reactor output,
wherein the hydroconversion reactor output and the gaseous mixture include the one or more contaminant gases, and further wherein the process comprises:
removing at least a portion of the one or more contaminant gases from the hydroconversion reactor output or the gaseous mixture.

14. The process of claim 13, wherein the one or more contaminant gases includes HCl and wherein the step of removing at least a portion of the one or more contaminant gases comprises contacting at least a portion of the hydroconversion reactor output or the gaseous mixture with a solid sorbent that adsorbs HCl.

15. The process of claim 11, wherein the hydropyrolyzing step is operated with continuous, intermittent, or localized high agitation conditions that reduce the formation of agglomerates of particles of the deoxygenating catalyst.

16. The process of claim 15, wherein the high agitation conditions include the continuous, intermittent, or localized use of a gas velocity that, in combination with the average particle size and particle size distribution of particles of the deoxygenating catalyst and agglomerates thereof in the hydropyrolysis reactor vessel, breaks formed agglomerates of particles of the deoxygenating catalyst.

17. The process of claim 16, wherein the high agitation conditions include intermittent and localized use of a gas velocity that exceeds the overall superficial velocity of fluidizing gas in the hydropyrolysis reactor vessel.

18. The process of claim 11, wherein the removing of the at least portion of plastic in the initial MSW feedstock provides the pretreated MSW feedstock as a first fraction and further provides a second fraction having a content of plastic that is higher, compared to the content of plastic of the pretreated MSW feedstock.

19. The process of claim 18, further comprising separately feeding the first and second fractions to the hydropyrolysis reactor vessel at separate locations.

20. The process of claim 11, wherein the higher value liquid product comprises gasoline or diesel fuel boiling-range hydrocarbons.

* * * * *